United States Patent
Harada et al.

(10) Patent No.: US 10,553,867 B2
(45) Date of Patent: Feb. 4, 2020

(54) ACTIVE MATERIAL, NONAQUEOUS ELECTROLYTE BATTERY, BATTERY PACK, AND VEHICLE

(71) Applicant: KABUSHIKI KAISHA TOSHIBA, Minato-ku (JP)

(72) Inventors: Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 351 days.

(21) Appl. No.: 15/428,816

(22) Filed: Feb. 9, 2017

(65) Prior Publication Data
US 2017/0271664 A1 Sep. 21, 2017

(30) Foreign Application Priority Data
Mar. 16, 2016 (JP) ................... 2016-052935

(51) Int. Cl.
*H01M 4/485* (2010.01)
*H01M 10/42* (2006.01)
(Continued)

(52) U.S. Cl.
CPC .......... *H01M 4/485* (2013.01); *H01M 4/131* (2013.01); *H01M 10/425* (2013.01);
(Continued)

(58) Field of Classification Search
CPC .. C01G 23/003; C01G 23/005; C01G 23/006; C01G 25/006; C01P 2002/30; C01P 2002/50; C01P 2002/52; C01P 2002/54; C01P 2002/72; C01P 2002/74; C01P 2002/76; C01P 2004/04; C01P 2004/61; C01P 2004/62; C01P 2004/80; C01P 2004/82; C01P 2006/12; C01P 2006/40; H01M 10/0525; H01M 10/425; H01M 2004/027; H01M 2010/4271; H01M 2220/20; H01M 4/131; H01M 4/366; H01M 4/485; H01M 4/505; H01M 4/525; H01M 4/5825; H01M 4/625; Y02E 60/122; Y02T 10/7011
See application file for complete search history.

(56) References Cited

U.S. PATENT DOCUMENTS

| 5,545,468 A | 8/1996 | Koshiba et al. |
| 2008/0003839 A1 | 1/2008 | Park et al. |

(Continued)

FOREIGN PATENT DOCUMENTS

| CA | 2 428 090 C | 4/2010 |
| JP | 6-275263 | 9/1994 |

(Continued)

OTHER PUBLICATIONS

JP2005267940 machine translation (Year: 2019).*
(Continued)

*Primary Examiner* — Lingwen R Zeng
(74) *Attorney, Agent, or Firm* — Oblon, McClelland, Maier & Neustadt, L.L.P.

(57) ABSTRACT

According to one embodiment, an active material is provided. The active material includes a composite of a phase of a titanium-including composite oxide and a phase of a titanium dioxide. The titanium-including composite oxide has crystal structures which belong to a space group Cmca, a space group Fmmm, or both the space group Cmca and the space group Fmmm.

15 Claims, 6 Drawing Sheets

(51) Int. Cl.
    *H01M 4/131* (2010.01)
    *H01M 4/02* (2006.01)
(52) U.S. Cl.
    CPC .......... *H01M 2004/027* (2013.01); *H01M 2010/4271* (2013.01); *H01M 2220/20* (2013.01)

(56) References Cited

U.S. PATENT DOCUMENTS

| | | | | |
|---|---|---|---|---|
| 2009/0042095 | A1* | 2/2009 | Inagaki | C01G 23/005 429/92 |
| 2012/0009449 | A1 | 1/2012 | Inagaki et al. | |
| 2012/0328930 | A1 | 12/2012 | Inagaki et al. | |
| 2015/0188123 | A1 | 7/2015 | Mizuno | |

FOREIGN PATENT DOCUMENTS

| | | | |
|---|---|---|---|
| JP | 2001-143702 | | 5/2001 |
| JP | 2005-267940 | | 9/2005 |
| JP | 2005267940 | A * | 9/2005 |
| JP | 2008-91079 | A | 4/2008 |
| JP | 4521431 | | 8/2010 |
| JP | 2013-8493 | | 1/2013 |
| JP | 2014-222667 | | 11/2014 |
| KR | 20150052195 | A | 5/2015 |
| WO | WO 2015/140964 | A1 | 9/2015 |
| WO | WO 2017/073765 | A1 | 5/2017 |

OTHER PUBLICATIONS

Mengmeng Lao, et al., "Advanced electrochemical performance of $Li_{1.95}Al_{0.05}Na_2Ti_6O_{14}$ anode material for lithium ion batteries", Accepted Manuscript, Electrochimica Acta, EA 25364, 2015, 38 pages http://dx.doi.org/10.1016/j.electacta.2015.07.082.

Mengmeng Lao, et al., "Enhanced electrochemical properties of $Mg^{2+}$ doped $Li_2Na_2Ti_6O_{14}$ anode material for lithium-ion batteries", Electrochimica Acta, 196, 2016, pp. 642-652.

R. Dominko et al. "Alkali hexatitanates-$A_2Ti_6O_{13}$ (A=Na, K) as host structure for reversible lithium insertion," ScienceDirect, Journal of Power Sources 174, www.sciencedirect.com, 2007, pp. 5.

Izumi Nakai et al. "Reality of Powder X-Ray Analysis," X-Ray Analysis Investigation Conversazione, The Japan Society for Analytical Chemistry, Asakura Publishing Co., Ltd, 2003, pp. 7(with English Translation).

Extended European Search Report dated May 29, 2017 in Patent Application No. 17153910.9.

Kaiqiang Wu, et al. "Comparative study of $Na_2Li_3Ti_6O_{14}$ prepared by different methods as advanced anode material for lithium-ion batteries," Journal of Electroanalytical Chemistry, vol. 717-718, XP028834160, 2014, pp. 10-16.

Kaiqiang Wu, et al. "Enhanced electrochemical performance of sodium lithium titanate by coating various carbons," Journal of Power Sources, vol. 272, XP029048983, 2014, pp. 283-290.

Kaiqiang Wu, et al. "Phase composition and electrochemical performance of sodium lithium titanates as anode materials for lithium rechargeable batteries," Journal of Power Sources, vol. 275, XP 029109324, 2015, pp. 419-428.

Mengmeng Lao, et al. "Enhanced lithium storage property of Na-doped $Li_2Na_2Ti_6O_{14}$ anode materials for secondary lithium-ion batteries," RCS Advances, An International Journal to Further the Chemical Sciences. vol. 5, No. 52. XP055285697. 2015, pp. 41999-42008.

Damien Dambournet et al., "$MLi_2Ti_6O_{14}$ (M=Sr, Ba, 2Na) Lithium Insertion Titanate Materials: A Comparative Study", Inorganic Chemistry, vol. 49, No. 6, 2010, pp. 2822-2826.

* cited by examiner

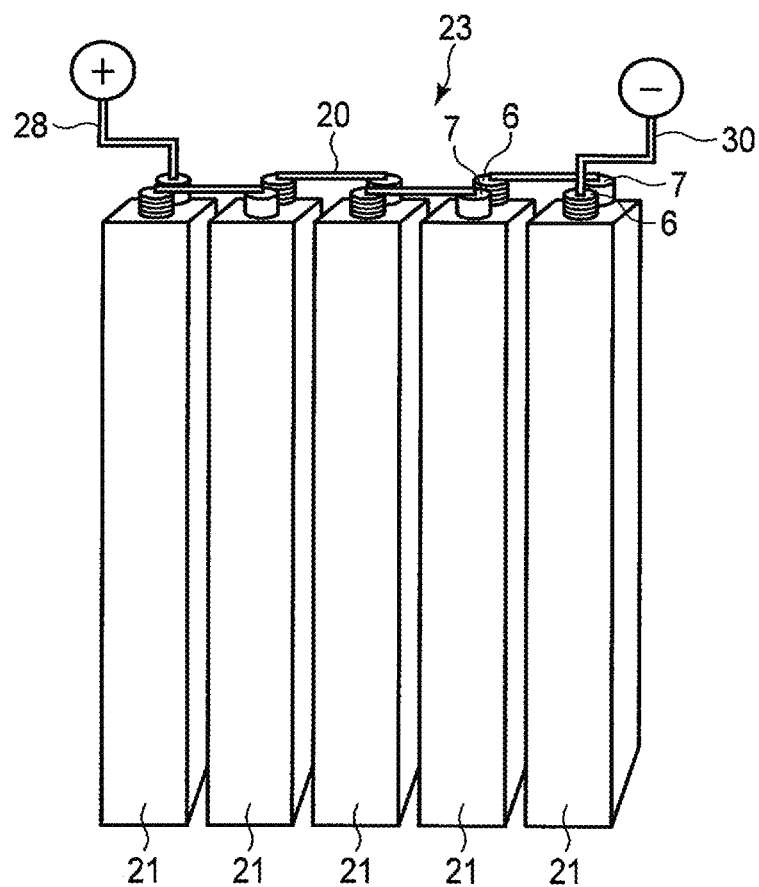
F I G. 3

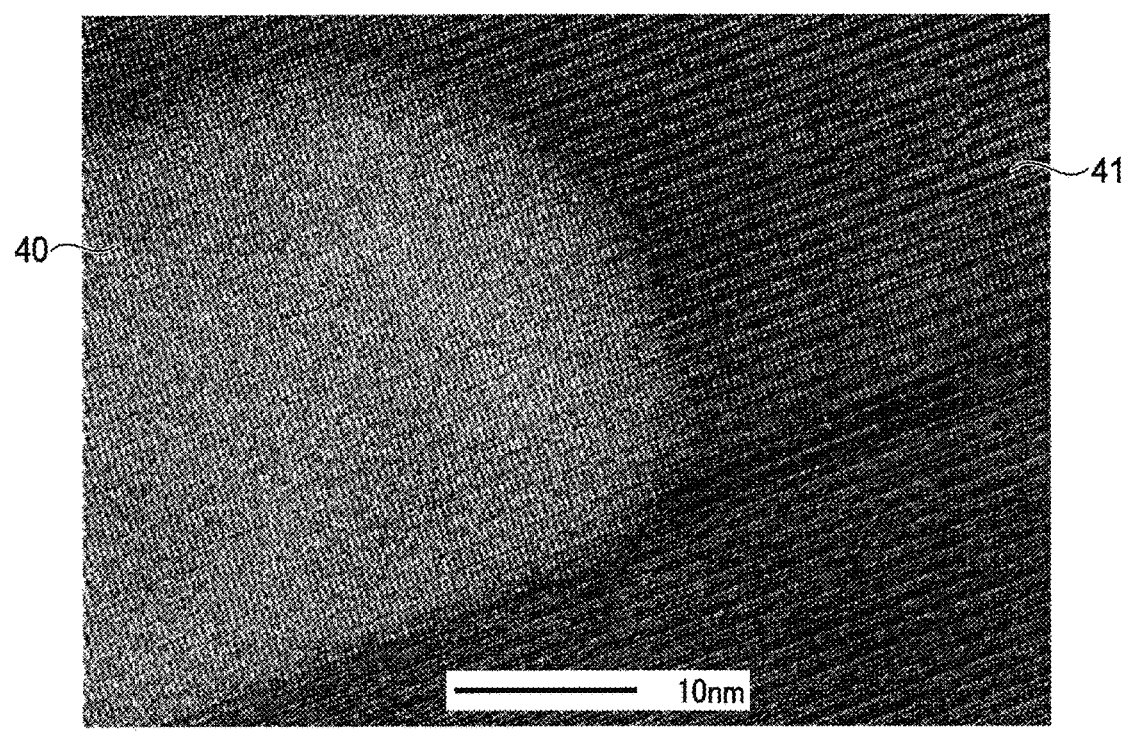
F I G. 6
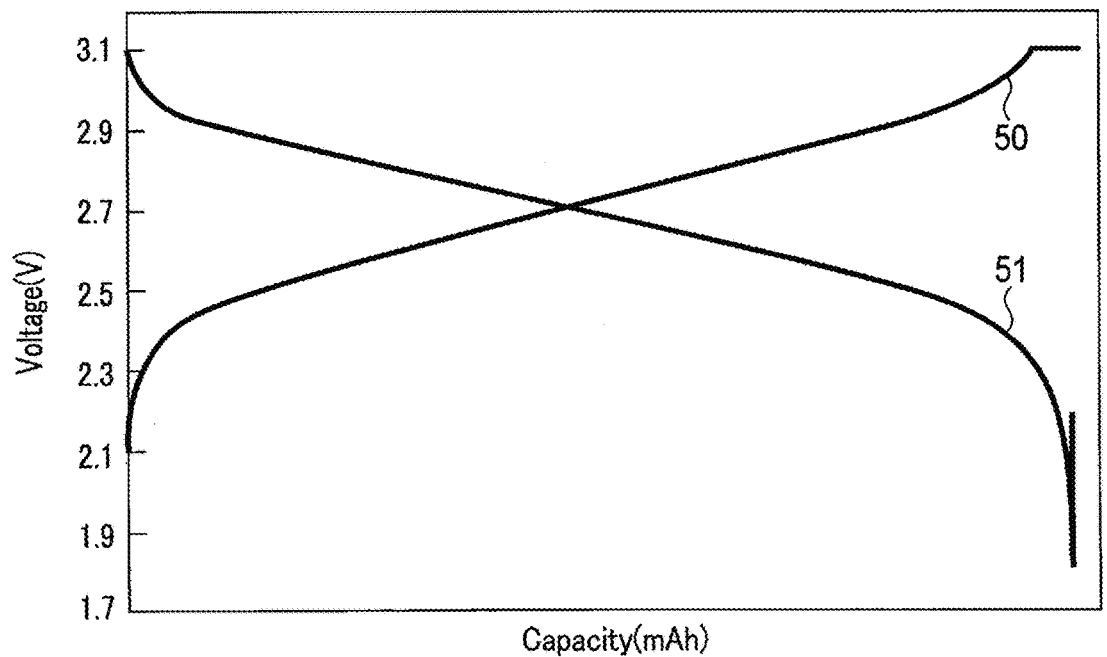
F I G. 7

ACTIVE MATERIAL, NONAQUEOUS ELECTROLYTE BATTERY, BATTERY PACK, AND VEHICLE

CROSS-REFERENCE TO RELATED APPLICATION

This application is based upon and claims the benefit of priority from Japanese Patent Application No. 2016-52935, filed Mar. 16, 2016; the entire contents of which is incorporated herein by reference.

FIELD

Embodiments relate to an active material, a nonaqueous electrolyte battery, a battery pack, and a vehicle.

BACKGROUND

In recent years, rapid technical development in the field of electronics has encouraged downsizing and weight-reducing of electronic devices. As a result, there has been progress in making electronic devices become portable and cordless, and accordingly, there has also been an earnest desire for rechargeable power sources driving the devices to have reduced size, reduced weight, and higher energy density. In order to fulfill such needs, there have been developed lithium secondary batteries with high energy density. Lately, super thin and light secondary batteries having a container member made of aluminum laminate film have also been developed and commercialized.

In such secondary batteries with a container member of aluminum laminate, battery thickness changes due to expansion and contraction of electrode volume that accompany charge and discharge. This causes deformation of the battery or broadening of space between electrodes, which in turn increase resistance of the battery, resulting in a problem of lowering performance of the battery.

There has been developed a battery in which lithium titanate is used as a material component for negative electrode active material, which can avoid such a problem. Lithium titanate has little volume change accompanying charge and discharge, and as a result, has an extremely small change in battery thickness. Use of this compound as a negative electrode active material has solved the problem described above.

BRIEF DESCRIPTION OF THE DRAWINGS

FIG. 3 is a schematic perspective view showing an example of a battery module according to a third embodiment;

FIG. 6 is an image of the active material of Example 22, photographed by a Transmission Electron Microscope (TEM);

FIG. 7 is a graph showing charge-and-discharge lines of the nonaqueous electrolyte battery of Example 31;

DETAILED DESCRIPTION

Figure 1:
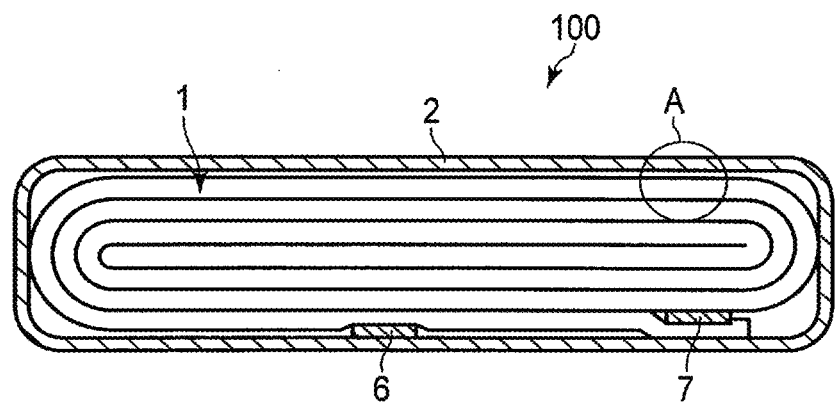
FIG. 1 is a schematic cross sectional view showing an example of a nonaqueous electrolyte battery according to a second embodiment.

According to an embodiment, an active material is provided. The active material includes a composite of a phase of a titanium-including composite oxide and a phase of a titanium dioxide. The titanium-including composite oxide has crystal structures which belong to a space group Cmca, a space group Fmmm, or both the space group Cmca and the space group Fmmm.

According to another embodiment, a nonaqueous electrolyte battery is provided. The nonaqueous electrolyte battery includes a positive electrode, a negative electrode, and a nonaqueous electrolyte. The negative electrode includes an active material according to an embodiment.

According to yet another embodiment, a battery pack is provided. The battery pack includes a nonaqueous electrolyte battery according to an embodiment.

According to even another embodiment, a vehicle is provided. The vehicle includes a battery pack according to an embodiment.

Embodiments will be explained below with reference to the drawings. Structures common among the embodiments are represented by the same symbols and over-lapping explanations are omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration. In addition, similar effects can be achieved, even if the compositional elements include inevitable impurities accompanying industrial material or industrial process.

First Embodiment

According to the first embodiment, an active material is provided. The active material includes a phase of a titanium-including composite oxide and a phase of a titanium dioxide. The active material also includes a region within which, a two phase composite composed of the phase of titanium-including composite oxide and the phase of titanium dioxide is present. The titanium-including composite oxide has crystal structures which belong to a space group Cmca and/or a space group Fmmm.

In lithium titanate, a Li insertion-extraction reaction proceeds at about 1.55 V (vs. Li/Li$^+$). Therefore, for example, a nonaqueous electrolyte battery in which lithium titanate is used as the negative electrode, and $LiMn_2O_4$ is used as the positive electrode, would have an average voltage of about 2.5 V. This voltage is lower than 3.9 V which is an average voltage of a secondary battery including a carbon negative electrode and a $LiMn_2O_4$ positive electrode, which is a broadly commercialized lithium secondary battery. Namely, in order to structure a battery module or a battery pack which exhibit an average voltage equal to that of a secondary battery including a carbon negative electrode and a $LiMn_2O_4$ positive electrode, by using a nonaqueous electrolyte battery which includes a negative electrode including lithium titanate and a positive electrode including $LiMn_2O_4$, it becomes necessary to increase number (number of cells)

of connection in series, in comparison with a case of using a secondary battery including a carbon negative electrode and a $LiMn_2O_4$ positive electrode.

In view of such a problem, for the purpose of increasing voltage of a cell, the present inventors have researched an active material for batteries capable of realizing a nonaqueous electrolyte battery, in which a Li insertion-extraction reaction proceeds at a potential lower than that of lithium titanate, which is at the same time capable of having both of a favorable low temperature input performance and a life performance equivalent to those in a case of using a lithium titanate.

As a candidate thereof, a titanium-including composite oxide having a crystal structure belonging to a space group Cmca and/or a space group Fmmm has been found. In such a titanium-including composite oxide, the Li insertion-extraction reaction proceeds at a potential of from about 1.2 V to 1.5 V (vs. $Li/Li^+$). Therefore, a nonaqueous electrolyte battery with a negative electrode including such a titanium-including composite oxide exhibits a cell voltage higher than that of a nonaqueous electrolyte battery including lithium titanate. It has now been found that the titanium-including composite oxide has poor electron conductivity. Therefore, a nonaqueous electrolyte battery with a negative electrode that includes the titanium-including composite oxide may have a poor input and output performance such as a poor large current performance, or may exhibit a poor life performance.

The present inventors have found that it is effective to disperse a titanium oxide within the titanium-including composite oxide. Namely, it had been found to be effective to produce a mixed-phase state between a phase of the titanium-including composite oxide having a crystal structure belonging to a space group Cmca or a space group Fmmm, and a phase of a titanium oxide. However, it has been found that when a simple mixed-phase state is produced, particles including a titanium oxide phase not involved in charge or discharge may be present. Presence of such a titanium oxide phase lowers an electrode capacity per unit weight. It has also been found that, in the case of a simple mixed-phase state, input performance at a low temperature may be lowered, due to Li—Li repulsion at Li insertion sites in a monoclinic crystal system.

As a result of earnest research in view of the above problems, the present inventors have found that it is possible to solve these problems, by including a region where the titanium-including composite oxide and a titanium dioxide form a two phase composite.

A titanium dioxide is a favorable conductor when it is in a charged state, namely, in a Li-inserted state. This is because, when Li is inserted in a titanium dioxide, the valence of titanium (Ti) changes from quadrivalent to trivalent. Moreover, by having a large irreversible capacity, a titanium dioxide can include trivalent titanium, even if Li has been extracted due to discharge, and thus, can maintain a high electron conductivity. The present inventors have found that the above mentioned problems can be solved by obtaining a nanocomposite material where at least a part of a region in a crystal domain which composes a particle of a titanium-including composite oxide belonging to a space group Cmca or a space group Fmmm, which has a poor electron conductivity, forms a two phase composite with a titanium dioxide, to thereby make the inside of the crystal domain become a favorable conductor.

This effect cannot be obtained by simply mixing powder of the titanium-including composite oxide and powder of a titanium dioxide together, or by producing a mixed-phase state of a titanium-including composite oxide phase and a titanium dioxide phase mixed at a particle level. The effect is expressed when having a nanocomposite phase where the titanium-including composite oxide and titanium dioxide form a two phase composite within the crystal domain.

As used herein, the crystal domain refers to an area that is made of the minimum single crystal. The state of forming a two phase composite within a crystal domain refers to a state where a part of a region made of the minimum single crystal is modified and the modified region has a crystal structure or an elemental composition different from that of the single crystal. A region in such a state can be referred to as a nanocomposite phase where each of the phases co-exists, for example, at a level of the minimum single crystal of plural kinds of crystal structures or elemental compositions. A material including, in this manner, particles that include two or more kinds of crystal structures or elemental compositions within a crystal domain is referred to as a nanocomposite material.

By virtue of including such a nanocomposite material, the active material according to the first embodiment can exhibit significantly improved electron conductivity, after being incorporated in a battery and subjected to initial charging. Moreover, the active material has a high charge-and-discharge capacity per unit weight, and Li—Li repulsion within a crystal domain is suppressed. Therefore, the active material according to the Embodiment can realize a nonaqueous electrolyte battery having both of an excellent input-and-output performance and a high capacity. The active material may be an active material for batteries.

An example of the titanium-including composite oxide may include a composite oxide represented by the general formula $Li_{2+a}M1_{2-b}Ti_{6-c}M2_dO_{14+\delta}$.

As used herein, M1 is at least one selected from the group consisting of Sr, Ba, Ca, Mg, Na, Cs, Rb, and K. M2 is at least one selected from the group consisting of Zr, Sn, V, Nb, Ta, Mo, W, Y, Fe, Co, Cr, Mn, Ni, and Al. The subscript a is within a range of $0 \le a \le 6$. The subscript b is within a range of $0 \le b < 2$. The subscript c is within a range of $0 \le c < 6$. The subscript d is within a range of $0 \le d < 6$. The subscript $\delta$ is within a range of from $-0.5 \le \delta \le 0.5$.

In an orthorhombic crystal structure of a composite oxide represented by the general formula $Li_{2+a}M1_{2-b}Ti_{6-c}M2_dO_{14+\delta}$, it is possible to reduce a part of the M1 site, and form a vacancy site which serves as a host for Li ions. For example, a composite oxide represented by the above general formula may be converted into a substituted oxide in which Ti sites are substituted with an M2 element, to thus convert M1 sites into vacancy sites. By introducing vacancies in the crystal structure of the composite oxide, it is possible to increase energy density per unit weight or per unit volume, while maintaining a lattice volume where Li ion is easily inserted and extracted. It is also possible to vary an average operating potential of an electrode by varying the amount of M1 element.

In this manner, design setting of voltage of a battery becomes easy.

The titanium-including composite oxide includes at least one of a crystal structure belonging to a space group Cmca or a crystal structure belonging to a space group Fmmm. The crystal structure included in the titanium-including composite oxide may be only the crystal structure belonging to the space group Cmca or only the crystal structure belonging to the space group Fmmm. The titanium-including composite oxide may also include both of the crystal structure belonging to the space group Cmca and the crystal structure belonging to the space group Fmmm. The titanium-including composite oxide may include, in addition to the crystal structures belonging to these space groups, a crystal structure belonging to a space group different from these space groups.

On the other hand, examples of the titanium dioxide include anatase-type titanium dioxides having a crystal structure belonging to a space group I4$_1$/amd and rutile-type titanium dioxides having a crystal structure belonging to a space group P4$_2$/mnm. The active material may include only the anatase-type titanium dioxide, or include only the rutile-type titanium dioxide. The active material may include both of the anatase-type titanium dioxide and the rutile-type titanium dioxide. It is particularly preferred that the active material includes the rutile-type titanium dioxide having a stable crystal structure and a favorable affinity with a crystal lattice of the composite oxide represented by the general formula Li$_{2+a}$M1$_{2-b}$Ti$_{6-c}$M2$_d$O$_{14+\delta}$. A rutile-type titanium dioxide is preferred also because Li that are once inserted into the rutile-type titanium dioxide are not extracted, and therefore, the rutile-type titanium dioxide itself is hardly involved in charge-and-discharge, and thus allows suppression of the Li—Li repulsion in a nanocomposite phase. In addition, a rutile-type titanium dioxide having Li inserted can maintain electron conductivity high, and therefore, can improve an electron conductivity of the nanocomposite phase.

Arrangement of atoms within the titanium dioxide crystal is such that six oxygen atoms coordinate around a titanium atom in the center, and the oxygen atoms forms edges of an octahedron. A rutile-type titanium dioxide has a structure extending linearly in the c-axis direction, with two edges of the octahedron being shared. On the other hand, an anatase-type has a linked structure, with four edges of the octahedron being shared. Therefore, the rutile-type having two edges shared has a higher degree of freedom in the arrangement of octahedrons, and thus has a higher affinity with the crystal structure of the titanium-including composite oxide represented by the general formula Li$_{2+a}$M1$_{2-b}$Ti$_{6-c}$M2$_d$O$_{14+\delta}$. As such, when the titanium-including composite oxide and the rutile-type titanium dioxide form a nanocomposite, distortion of a peripheral lattice in the crystal structure is reduced, and movement of Li ions becomes smooth. As a result, an amount of Li ions that can be inserted is increased, and the charge-and-discharge performance is improved. Thus, a rutile-type titanium dioxide is preferred.

Mixing ratio between the titanium-including composite oxide and the titanium dioxide in an active material can be checked by calculating an intensity ratio in an X-ray diffraction pattern obtained by a later-described powder x-ray diffraction method in which Cu-Kα ray is used. It is preferred that, in the active material according to the embodiment, an intensity ratio $I_{Ti-R}/I_H$ between an intensity $I_{Ti-R}$ of a diffraction peak assigned to a main peak of the rutile-type titanium dioxide among diffraction peaks appearing within a range of 26°≤2θ≤28° and an intensity $I_H$ of a diffraction peak having the strongest intensity among diffraction peaks appearing within a range of 18.5°<2θ≤19.5° should be within a range of 0.01≤$I_{Ti-R}/I_H$≤1, in an X-ray diffraction pattern obtained by powder X-ray diffraction method using a Cu-Kα ray.

In another preferred aspect, it is preferred that, in the active material, an intensity ratio $I_{Ti-A}/I_H$ between an intensity $I_{Ti-A}$ of a diffraction peak assigned to a main peak of the anatase-type titanium dioxide among diffraction peaks appearing within a range of 24°≤2θ<26° and an intensity $I_H$ of a diffraction peak having the strongest intensity among diffraction peaks appearing within a range of 18.5°<2θ≤19.5° should be within a range of 0.01≤$I_{Ti-A}/I_H$≤1, in an X-ray diffraction pattern obtained by powder X-ray diffraction method using a Cu-Kα ray.

Active materials having the intensity $I_{Ti-R}/I_H$ or $I_{Ti-A}/I_H$ within the above ranges have an excellent electron conductivity, and thus, are capable of obtaining an excellent low-temperature input performance. An active material having the intensity $I_{Ti-R}/I_H$ or $I_{Ti-A}/I_H$ within the ranges also have a large Li insertion-extraction amount, and thus, are capable of realizing a nonaqueous electrolyte battery which exhibits a high energy density.

The active material according to the first embodiment may have, for example, a particulate form. The active material according to the first embodiment may be, for example, primary particles, or secondary particles each composed of agglomerated primary particles.

It is preferred that the active material according to the first embodiment have a form of primary particles, from a viewpoint of life performance. In a case where the active material is in a form of secondary particles, there is concern that the secondary particles break apart due to volume change of the active material, leading to lowering of the life performance.

In a case where the active material includes secondary particles, it is preferred that the average secondary particle size is from 1 μm to 100 μm. An average particle size of the secondary particle within this range facilitates handling during industrial production, allows a coating during electrode production to have uniform weight and thickness, and can prevent deterioration of surface smoothness of the electrode. It is more preferred that an average particle size of the secondary particle is from 3 μm to 30 μm.

It is possible to examine whether the active material includes the secondary particle, for example, by an observation with a Scanning Electron Microscope (SEM).

The primary particles included in the secondary particles preferably have an average primary particle size of from 100 nm to 5 μm. An average primary particle size within this range facilitates handling during industrial production, and can enhance diffusion of Li ions within a solid of the titanium-including composite oxide. It is more preferred that the average primary particle size be from 300 nm to 1 μm.

The primary particle preferably has an isotropic shape. As used herein, a particle having an isotropic shape refers to a particle having an aspect ratio of 3 or less. It is possible to examine whether the primary particle is an isotropic particle, by an observation with a Scanning Electron Microscope (SEM).

It is preferred that the active material have a specific surface area as measured by the BET method of from 3 m$^2$/g to 50 m$^2$/g. A specific surface area of 3 m$^2$/g or more allows insertion-extraction sites for Li ion to be secured sufficiently. A specific surface area of 50 m$^2$/g or less facilitates handling during industrial production. A method of measuring a specific surface area by the BET method will be described later.

It is preferred that the active material according to the first embodiment have a layer including carbon formed on at least a part of the surface of a particle thereof. The active material according to the first embodiment can exhibit a superior electron conductivity, by further including the layer including carbon. An amount of carbon is preferably within a range of from 0.1% by mass to 10% by mass relative to a mass of the active material. When the amount is within this range, it is possible to obtain an effect of enhancing the electron conductivity, while securing a sufficient capacity. More preferably, the amount of carbon included is from 1% by mass to 3% by mass relative to a mass of the active material. An amount of carbon can be quantitated, for example, by a high-frequency heating-infrared absorption method.

The active material according to the first embodiment may further include an impurity, which is inevitable in a production, at an amount of 1000 ppm by mass or less, in addition to the element M1, the element M2, and the carbon.

The active material according to the first embodiment described above is produced, for example, as follows.

First, a lithium salt such as lithium hydroxide, lithium oxide, or lithium carbonate is prepared as a Li source. In a case of synthesizing a titanium-including composite oxide that includes sodium, a sodium salt such as sodium hydroxide, sodium oxide, or sodium carbonate is prepared as a Na source. Then, a predetermined amount of the prepared raw materials such as these Li source is dissolved in pure water.

Next, in the case of synthesizing a titanium-including composite oxide that includes sodium, a titanium oxide is put in the thus obtained solution, such that element ratio of lithium, titanium, and sodium becomes a predetermined ratio. For example, in a case of synthesizing a titanium-including composite oxide having a composition formula $Li_2Na_2Ti_6O_{14}$, blending is conducted such that element ratio of lithium, sodium, and titanium would be 2:2:6.

In a case of synthesizing a titanium-including composite oxide that includes barium and/or strontium, the blending is conducted such that titanium oxide, and oxide or carbonate of strontium and/or barium are put in a solution obtained by dissolving the Li source in pure water, such that element ratio of lithium, titanium, and strontium and/or barium would be of a predetermined ratio.

Then, the obtained solution is dried under stirring, to thus obtain a calcination precursor. Examples of drying method include spray drying, granulation drying, freeze drying, or any combination thereof. The obtained calcination precursor is calcined, and thus, a titanium-including composite oxide is obtained. The calcination may be performed in air. Alternatively, the calcination may also be performed in an oxygen atmosphere, or in an inert atmosphere using argon or the like.

In the above procedures, the raw materials such as the Li source may be mixed simply as powder, without dissolving in pure water. However, it is preferred to proceed through the above procedures, in order to mix the raw materials more uniformly, and to suppress production of impurity phase.

It is preferred to perform a provisional calcination, before the calcination precursor of the mixed raw materials is subjected to main calcination. By performing the provisional calcination, a composition within a particle of a product after the main calcination more readily becomes uniform, which facilitates production of a nanocomposite phase. The provisional calcination is performed, for example, at a temperature of from 500° C. to 1000° C., over a span of from 30 minutes to 24 hours. After the provisional calcination, the obtained provisional calcination product is re-ground and blended. Means of the re-grinding at this time is not particularly limited, and grinding in a degree capable of breaking apart agglomeration of the particles produced by the provisional calcination is sufficient.

Next, the ground provisional calcination product is subjected to the main calcination under a temperature condition of from 800° C. to 1100° C., for example, over a span of from 1 hour to 6 hours, to thus synthesize the titanium-including composite oxide, and becomes the main phase of the active material. By further subjecting to a heat treatment under a temperature condition of from 900° C. to 1300° C., for example, over a span of from 1 hour to 12 hours a part of alkali elements (lithium and sodium) in the composition of the titanium-including composite oxide is evaporated. After the evaporation treatment by heating, the composite oxide is rapidly cooled down to room temperature, in order to maintain a crystal state where the alkali elements have been extracted therefrom. The heat treatment for the alkali evaporation is preferably performed after performing a re-grinding, after completing the main calcination; however, the evaporation treatment by the heating may also be conducted subsequently to the main calcination, without performing the re-grinding. In this manner, the alkali elements within a crystal domain in the produced titanium-including composite oxide are lost, and titanium dioxide is produced from the titanium element left in excess.

Thus, within a crystal domain of the titanium-including composite oxide as the main phase, titanium dioxide is produced, and in this manner, it is possible to obtain a particle including a region where a titanium-including composite oxide and a titanium dioxide are converted into a nanocomposite. That is, the region converted into a nanocomposite is a nanocomposite phase where there is composed a two phase composite having a main phase of a titanium-including composite oxide, and a second phase of a titanium dioxide produced from a part of the main phase that has been modified within a crystal domain.

It is possible to control amount of the titanium dioxide in the nanocomposite phase, by varying heating temperature and heating time. The higher the heating temperature or the longer the heating time, the larger the amount of produced titanium dioxide can be. A titanium dioxide obtained through an evaporation treatment under the conditions described above would have a rutile structure extending linearly in the c-axis direction, having two shared edges of an octahedron formed with oxygen atoms. On the other hand, an anatase-type structure is a low temperature stable structure, linked with four edges of the octahedron shared. In order to obtain this structure, it is necessary that nanocomposite materials be subjected to an annealing treatment under a condition of a temperature of from 350° C. to 650° C. and a span of from 1 hour to 36 hours, and then rapidly cooled down to a room temperature.

It is possible to control pore capacity and average pore size of the primary particles, by grinding and re-calcining the particles including the nanocomposite phase of the titanium-including composite oxide and the titanium dioxide, as obtained by the calcination described above, under a condition described below. Examples of method of the grinding include methods using a mortar, a ball mill, a sand mill, a vibrating ball mill, a planetary ball mill, a jet mill, a counter jet mill, a spinning air flow type jet mill, and a sieve, or the like. At the time of the grinding, it is also possible to use a wet grinding in which particles of the calcined product and a liquid grinding aid coexist. Examples of publicly known liquid grinding aids include water, ethanol, ethylene glycol, benzene, or hexane. Use of a grinding aid is effective in improving grinding efficiency or in increasing production amount of fine powder. More preferred method is a grinding by use of a ball mill, in which a ball made of zirconia is used for medium, and even more preferred is wet grinding with a liquid grinding aid added. An organic material such as a polyol which improves grinding efficiency may further be added as a grinding aid. The kind of the polyol is not particularly limited, and it is possible to use pentaerythritol, triethylolethane, trimethylolpropane or the like alone or in combination.

On the other hand, there is a concern that the performing of grinding causes a deterioration of crystallinity. In this case, it is possible to improve the crystallinity by performing a recalcination after the grinding. The recalcination may be performed, for example, in air. Alternatively, the recalcination may be performed also in an oxygen atmosphere, or in an inert atmosphere using argon, or the like. The recalcination may be performed under a temperature condition of from 250° C. to 900° C., for example, over a span of from 1 minute to 10 hours. When the calcination temperature is 900° C. or higher, the calcination of the ground powder proceeds even in a short time of heat treatment, leading to pores within the crystal structure becoming closed up. As a result, it is difficult to obtain a preferred pore size distribution. When the calcination temperature is lower than 250° C., impurity (organic substances) that may become adhered at the time of wet grinding cannot be removed, and as result, performance as an active material for batteries is deteriorated. It is preferred that the recalcination be performed under a temperature condition of from 400° C. to 700° C., over a span of from 10 minutes to 3 hours.

It is also desirable that a pH value of the active material particle be within a range of from 10 to 11.2. In the calcination process of the titanium-including composite oxide, Li component and/or Na component may not be incorporated into the titanium-including composite oxide, in some cases. In such cases, a by-product such as lithium carbonate, sodium carbonate, lithium hydroxide, sodium hydroxide, or the like may be produced, due to the unreacted Li component and/or Na component. A pH value of a particle including the titanium-including composite oxide being smaller than 11.2 indicates that the unreacted Li component and/or Na component has been reduced. Therefore, by controlling pH value of the active material particle to be a value smaller than 11.2, it is possible to improve a performance as an active material for batteries, particularly, a high temperature cycling performance or an output performance.

When the by-product such as lithium carbonate, sodium carbonate, lithium hydroxide, sodium hydroxide, and the like produced from the unreacted Li component and/or Na component is left on the surface of an active material particle, such by-product left on the surface of the active material particle reacts with the nonaqueous electrolyte to generate carbon dioxide or a hydrocarbon gas. Further, due to such a side reaction, an organic film which acts as an electrical resistance component is formed on the surface of the active material. Therefore, it is possible to improve performance of a battery, by reducing such a by-product to control side reactions.

A pH value of an active material may be controlled, for example, as follows. An active material particle directly after conversion into nanocomposite has been conducted is hardly influenced by alkali, because Li component and/or Na component near the surface of a particle has been evaporated due to performing of the evaporation treatment. However, in a case where particles are mechanically ground as described above, Li component and/or Na component left inside the particle may be exposed to the surface. There is tendency for battery performance to become lowered, when such active material particles are used. By performing recalcination after the grinding, Li component and/or Na component exposed on the surface is evaporated, or incorporated into the particle, and thereby it is possible to reduce the Li component and/or Na component left on the surface of a particle. That is, it is possible to control the pH value of the active material to be 11.2 or less, by performing the recalcination process after the grinding.

A pH value of a particle including the titanium-including composite oxide (for example, a particle of the active material of the embodiment) may be measured by the following procedure. Namely, 1 g of particles including the titanium-including composite oxide are dispersed in 50 mL of pure water (25° C.), and after stirring for about 10 minutes, the dispersed particles are filtrated and a filtrate is obtained. A pH value of the filtrate is adopted as a pH value of the particles including the titanium-including composite oxide.

Method of Examining Active Material According to First Embodiment

Next, described are a method of examining a crystal structure, a method of examining whether the formation of two phase composite in a crystal domain had occurred, a method of measuring an amount of carbon, a method of measuring an average particle size of the secondary particle, a method of measuring an average particle size of the primary particle, and a method of measuring a specific surface area of the active material according to the first embodiment.

The active material according to the first embodiment may be, if installed in a battery, extracted, for example, as follows. First, the battery is brought into a discharged state. For example, it is possible to bring the battery into a discharged state, by discharging the battery in an environment of 25° C. at a current of 0.1 C to a rated cutoff voltage. Next, the battery in the discharged state is disassembled and an electrode (e.g., a negative electrode) is taken out. The taken-out electrode is washed, for example, with methyl ethyl carbonate.

The washed electrode is used as a measurement sample, after being appropriately processed or treated according to each measurement method. For example, when subjecting to a powder X-ray diffraction measurement, the washed electrode is cut to be of an area about equal to the area of the holder of a powder X-ray diffractometer, and used as a measurement sample, as described later.

An active material is extracted from the electrode if necessary, and used as a measurement sample. For example, in a case of measuring an amount of carbon included in an active material as described later, first, the electrode washed as described above is put in water to deactivate the electrode layer. The active material can be extracted from the deactivated electrode, by use of a centrifugal separator, or the like. For example, in a case where polyvinylidene difluoride (PVdF) was used as the binder, the extraction process is performed in such a manner that the binder component is washed off, for example, with N-methyl-2-pyrrolidone (NMP), and then a conductive agent is removed with a mesh having an appropriate aperture. These components, if slightly left, may be removed by a heat treatment in air (e.g., at 250° C. for 30 minutes).

<Method of Examining Crystal Structure of Active Material>

First, a method of examining the crystal structure of the active material will be explained.

The crystal structure of the active material can be examined by powder X-ray Diffraction (XRD) analysis.

The powder X-ray diffraction measurement of the active material is performed as follows: First, the target sample is ground until an average particle size reaches about 5 μm. The average particle size can be obtained, for example by laser diffraction, as explained later. The ground sample is filled in a flat holder part having a depth of 0.2 mm, formed on a glass sample plate. At this time, care should be taken to fill the holder part sufficiently with the sample. Precaution should be taken to avoid cracking and voids caused by insufficient filling of the sample. Then, another glass plate is used to smoothen the surface of the sample by sufficiently pressing with the glass plate. In this case, precaution should be taken to avoid too much or too little filling amount, so as to prevent any rises and dents in the basic plane of the glass holder. Next, the glass plate filled with the sample is set in a powder X-ray diffractometer. And then, an x-ray diffraction (XRD) pattern is obtained using Cu-Kα rays.

In the case where there is high degree of orientation in the arrangement of the crystal planes in a specific direction according to the shapes of particles, there is the possibility of deviation of peak position and variation in an intensity ratio, depending on the way of filling the sample when the glass plate is filled with the sample. In the case of such a sample having high degree of orientation, the sample is measured using a capillary. Specifically, the sample is inserted into the capillary, which is then mounted on a rotary sample table and measured while being rotated. Such a method can provide XRD patterns of the active material with the influence of orientation reduced. In the case that there is a difference between the intensity ratio measured using this method and the intensity ratio measured using the above-described flat holder, it can be considered that orientation has an influence, and thus the measurement result using the rotary sample table is adopted.

When the target active material to be measured is included in the electrode material of the nonaqueous electrolyte battery, first, the electrode is taken out from the nonaqueous electrolyte battery according to the previously described procedure. The taken-out and washed electrode is cut to be of an area about equal to the area of the holder of a powder X-ray diffractometer, and used as the measurement sample.

The obtained measurement sample is affixed directly to the glass holder, and measured. In this case, the position of the peak originated from the electrode substrate such as a metal foil is measured in advance. The peaks of other components such as a conductive agent and a binder are also measured in advance. In a case such that the peaks of the substrate and active material overlap each other, it is desirable that the layer including the active material (e.g., the later-described electrode layer) be separated from the substrate, and subjected to measurement. This is in order to separate the overlapping peaks when quantitatively measuring the peak intensity. For example, the active material layer can be separated by irradiating the electrode substrate with an ultrasonic wave in a solvent. In order to reduce the influence from orientation, in a similar manner as described above for a powder sample, the active material layer is inserted into a capillary, mounted on a rotary sample table, and measured.

Conditions of the above described powder X-ray diffraction measurement is set to conditions where an X-ray diffraction (XRD) pattern that is applicable to Rietveld analysis can be obtained. Specifically, in order to collect data for Rietveld analysis, the measurement time or X-ray intensity is appropriately adjusted in such a manner that the step width is made ⅓ to ⅕ of the minimum half width of the diffraction peaks, and the intensity at the peak position of strongest reflected intensity is 5,000 cps or more.

The XRD pattern obtained as described above is analyzed by the Rietveld method. In the Rietveld method, the diffraction pattern is calculated from the crystal structure model which has been previously estimated. The parameters of the crystal structure (lattice constant, atomic coordinate, crystal site occupancy ratio, or the like) can be precisely analyzed by fitting all the calculated values with the measured values. Thereby, the characteristics of the crystal structure of the synthesized compound can be determined.

Furthermore, the site occupancy ratio of compositional elements in each of the sites can be determined. A fitting parameter S is used as the scale for estimating the degree of agreement between the measured intensities and the calculated intensities in the Rietveld analysis. Analysis must be performed in a manner such that the S value would be less than 1.8. When determining the occupancies in each of the sites, the standard deviation σj must be taken into consideration. The fitting parameter S and standard deviation of defined herein are estimated using the formula described in "Funmatsu X sen Kaisetsu no Jissai (Reality of Powder X-Ray Analysis)", X-Ray Analysis Investigation Conversazione, The Japan Society for Analytical Chemistry, written and edited by Izumi Nakai and Fujio Izumi (Asakura Publishing Co., Ltd.)).

In a case where an active material as the measured target includes crystals having space groups different from each other, it is possible to quantitate the included amount of the space groups by the Rietveld analysis. Specifically, information of crystal structure for each of the different crystal phases is individually input, and the input information is fitted with an actually measured XRD pattern, to thereby obtain a mass fraction, based on information on intensity of each phase. More specifically, the mass fraction can be obtained by a method described in Section 5, Chapter 10 of "Funmatsu X sen Kaisetsu no Jissai (Reality of Powder X-Ray Analysis)", X-Ray Analysis Investigation Conversazione, The Japan Society for Analytical Chemistry, written and edited by Izumi Nakai and Fujio Izumi (Asakura Publishing Co., Ltd.)).

In the same manner, it is possible to determine an amount of vacancy in a target titanium-including composite oxide. Specifically, the atom occupancy in the crystal structural model can be refined by Rietveld analysis. From this result, the presence or absence of the formation of vacancies for each of the active materials can be examined. Specifically, that the value of the atom occupancy obtained as a result of refinement is below 100% indicates that the sites which should be occupied are not occupied by the atoms. In other words, the occupancy is 100% when no vacancy is formed in the target site, and the occupancy is less than 100% when a vacancy is formed in the site. Thus, the presence or absence of the formation of vacancy can be examined by Rietveld analysis.

As described above, it is also possible to examine a mixing ratio between the titanium-including composite oxide and the titanium dioxide in the active material, by use of powder X-ray diffraction measurement. Specifically, the mixing ratio can be calculated from an intensity $I_{Ti-A}$ of the main peak appearing within a range of $24° \leq 2\theta < 26°$ and an intensity $I_{Ti-R}$ of the main peak appearing within a range of $26° \leq 2\theta \leq 28°$, and an intensity $I_H$ of a peak having the strongest intensity among the diffraction peaks appearing within a range of $18.5° < 2\theta \leq 19.5°$ in the XRD pattern.

By the methods described above, it is possible to obtain information on crystal structure of a target active material that is measured. For example, when an active material according to the first embodiment is measured as described above, it would be recognized that the active material as the target of the measurement includes a composite oxide having a crystal structure of a space group Fmmm or Cmca, and further includes a titanium dioxide having a crystal structure belonging to a space group I4$_1$/amd or P4$_2$/mnm which composes a nanocomposite along with the composite oxide. In addition, even if composite oxides having space groups different from each other have been mixed, for example, it is possible, by measuring as above, to obtain the included amounts thereof as mass fractions.

<Method Examining Whether Formation of Two Phase Composite in Crystal Domain had Occurred>

A state of the titanium dioxide in the active material can be examined by using an powder X-ray diffraction (XRD) method. By observing a crystal phase by XRD, it is possible to determine whether or not the titanium-including composite oxide phase and the titanium dioxide phase compose a two phase composite (form a nanocomposite) within the crystal domain of the titanium-including composite oxide, in a crystal structure of the active material. Specifically, by an XRD measurement in the same manner as described above, presence of titanium dioxide phase, and a change in a lattice constant of the titanium-including composite oxide or a change in a lattice constant of the titanium dioxide in the target region being measured (the region where the presence of two phase composite is examined) are determined. As used herein, the change in a lattice constant of the titanium-including composite oxide refers to, for example, a difference between a lattice constant of a single phase titanium-including composite oxide which has not formed a two phase composite with a titanium dioxide, and a lattice constant of a titanium-including composite oxide in the target region being measured. An ionic radius of an element added to the target region, namely titanium, is reflected in this change in lattice constant. As used herein, the change in a lattice constant of the titanium dioxide refers to, for example, a difference between a lattice constant in a single phase titanium dioxide which has not formed a two phase composite with a titanium-including composite oxide, and a lattice constant of the titanium dioxide in the target region being measured. A lattice constant of titanium-including composite oxide that is present around the titanium dioxide phase in the target region is reflected in this change in lattice constant. In either case, when an increase or a decrease of 0.5% or more from a lattice constant of a target titanium-including composite oxide or titanium dioxide each measured as a single phase is observed, in a lattice constant in the region where the presence of two phase composite is being examined, it can be determined that the region is a nanocomposite phase, that is, that the titanium-including composite oxide and the titanium dioxide has formed a two phase composite within the crystal domain in that region. Namely, a value (an absolute value) of 0.5% or more of a change in lattice constant of the titanium-including composite oxide indicates that the titanium-including composite oxide has been modified within the crystal domain. The lattice constant of a single phase as used herein refers to, with respect to either of the compounds, a lattice constant obtained by measuring a powder composed only of single phase particles that do not include any crystal phase other than the main phase of the compound.

However, when the amount of titanium dioxide forming a two phase composite with the titanium-including composite oxide is small, the change in a lattice constant cannot be recognized in some cases, where it is not possible to determine whether or not formation of the two phase composite has occurred. In such a case, an observation by a Transmission Electron Microscope (TEM) and a measurement by an Electron Probe Micro Analysis (EPMA) are performed. By these methods, it is possible to know a state of distribution of titanium element in a particle and in a crystal domain. Specifically, first, the titanium dioxide phase can be identified on the basis of an electron diffraction inside a particle domain by a TEM. Next, an elemental mapping is investigated by EPMA to examine distribution of titanium elements and sodium elements in the active material. When the titanium elements are evenly distributed in a particle of the active material and in a crystal domain that structure the active material, and at the same time, the sodium elements are also evenly distributed, it can be determined that there has formed a two phase composite composed of the titanium dioxide phase and the titanium-including composite oxide as a main phase. On the other hand, when the sodium elements are not evenly distributed, and only the titanium elements are distributed unevenly being biased toward the crystal grain boundary, or when particles including only titanium elements can be recognized, such case can be determined to be in a state where the titanium-including composite oxide and the titanium dioxide have not formed a two phase composite within the crystal domain. Namely, such a case is not in the state of a nanocomposite phase, but is in a state of a mixed phase of the titanium-including composite oxide and the titanium dioxide mixed at a particle level.

<Method of Measuring Carbon Amount>

The amount of carbon included in the active material can be measured by using, for example, the active material extracted from an electrode as described above, and drying the active material at 150° C. for 12 hours, weighing the active material out in a container, and measured using a measuring device (e.g., CS-444LS manufactured by LECO).

In the case that other active materials are included in the electrode, measurement can be performed as follows. The active material extracted from the electrode is subjected to measurement by transmission electron microscopy-energy dispersive x-ray spectroscopy (TEM-EDX), and the crystal structure of each particle is identified using the selected area diffraction method. The particles having a diffraction pattern assigned to titanium-including composite oxides are selected, and the amount of included carbon is measured. At this time, the areas where carbon is present can be found by acquiring carbon mapping by EDX.

<Method Measuring Average Particle Size of Secondary Particle>

An example of a method of measuring an average particle size of secondary particles is as follows. As a measuring device, a laser diffraction distribution analyzer (SALD-300, Shimadzu) is used. First, about 0.1 g of sample is put into a beaker, to which is added a surfactant and 1 to 2 mL of distilled water and stirred well, and the mixture is poured into a stirring bath to prepare a sample solution therein. By using this sample solution, a luminous intensity distribution is measured for 64 times at intervals of 2 minutes, and particle size distribution data are analyzed.

<Method Examining Average Particle Size of Primary Particle>

An average primary particle size can be examined by an observation with a scanning electron microscope (SEM). An average primary particle size is determined by obtaining an average of 10 typical particles extracted from a typical viewing field.

<Method Measuring Specific Surface Area>

As a method of measuring a specific surface area, used herein is method where molecules, in which an occupied area in adsorption is known, are adsorbed onto the surface of powder particles at the temperature of liquid nitrogen, and the specific surface area of the sample is determined from the amount of adsorbed molecules. The most frequently used method is a BET method based on the low temperature/low humidity physical adsorption of an inert gas. This BET method is a method based on the BET theory, which is the most well-known theory of the method of calculating the specific surface area in which the Langmuir theory, which is a monolayer adsorption theory, is extended to multilayer adsorption. The specific surface area determined by the above method is referred to as "BET specific surface area".

The active material according to the first embodiment as described above may be used in either a negative electrode or a positive electrode of a nonaqueous electrolyte as an active material for battery. Regardless of whether the active material is applied to a negative electrode or a positive electrode, the active material can realize a nonaqueous electrolyte battery capable of exhibiting an excellent input-and-output performance and an excellent life performance.

When the active material according to the first embodiment is used in a positive electrode, examples of the active material which may be used in a negative electrode as the counter electrode include metallic lithium, lithium alloys, or carbonaceous materials such as graphite or coke.

When the active material according to the first embodiment is used as a negative electrode active material in a negative electrode, the active material may be used alone or may be used together with other active materials. Examples of such other active materials include lithium-titanium composite oxides having a spinel type structure (such as $Li_4Ti_5O_{12}$), niobium-including oxides (such as $Nb_2O_5$ and $TiNb_2O_7$), or iron composite sulfides (such as FeS, or $FeS_2$). One of or two or more kinds of these other active materials may be used.

Similarly, when the active material according to the first embodiment is used as a positive electrode active material in a positive electrode, the active material may be used alone or may be used together with other active materials. Examples of such other active materials include lithium-titanium composite oxides having a spinel type structure (such as $Li_4Ti_5O_{12}$), niobium-including oxides (such as $Nb_2O_5$ and $TiNb_2O_7$), or iron composite sulfides (such as FeS, or $FeS_2$). One of or two or more kinds of these other active materials may be used.

According to the first embodiment as described above, an active material is provided. This active material includes a phase of a titanium-including composite oxide having a crystal structure belonging to a space group Cmca and/or a space group Fmmm, and a phase of titanium dioxide, and includes a region where the titanium-including composite oxide and the titanium dioxide compose a two phase composite. As a result, the active material according to the first embodiment can realize a nonaqueous electrolyte battery capable of exhibiting an excellent input-and-output performance and an excellent life performance.

Second Embodiment

According to the second embodiment, a nonaqueous electrolyte battery is provided. This nonaqueous electrolyte battery includes a positive electrode, a negative electrode and a nonaqueous electrolyte. The negative electrode includes the active material according to the first embodiment.

The nonaqueous electrolyte battery according to the second embodiment can further include a separator provided between the positive electrode and the negative electrode. The positive electrode, the negative electrode, and the separator can compose an electrode group. The nonaqueous electrolyte may be held in the electrode group.

The electrode group may have, for example, a layered stack-type structure. In a stack-type electrode group, a plural number of the positive electrodes and the negative electrodes are alternately stacked with separators interposed therebetween.

Alternatively, the electrode group may have a wound-type structure. The wound-type electrode group may be formed by winding the layered stack including a positive electrode, a negative electrode, and a separator stacked together.

The nonaqueous electrolyte according to the second embodiment may further include a container member in which the electrode group and the nonaqueous electrolyte are housed, a negative electrode terminal, and a positive electrode terminal.

The positive electrode and the negative electrode may be spaced apart from each other, having the separator in between. The negative electrode terminal may be electrically connected to the negative electrode. The positive electrode terminal may be electrically connected to the positive electrode.

Hereinafter, the container member, the negative electrode, the positive electrode, the nonaqueous electrolyte, the separator, the positive electrode terminal, and the negative electrode terminal will be described in detail.

1) Container Member

The container member may be formed of, for example, a laminate film having a thickness of 0.5 mm or less. Alternatively, the container member may be formed of a metal case having a wall thickness of 1.0 mm or less. The thickness of the laminate film is more preferably 0.2 mm or less. The wall thickness of the metal case is more preferably 0.5 mm or less, and still more preferably 0.2 mm or less.

The shape of the container member is not particularly limited, and may be selected from, for example, flat (thin), square, cylinder, coin, or button-shape. Examples of the container member include, depending on the size of the battery, for example that for a compact battery installed in mobile electronic devices, or a large battery installed in vehicles such as two- to four-wheel automobiles.

As the laminate film, used is a multilayer film including resin layers and a metal layer sandwiched between the resin layers. The metal layer is preferably an aluminum foil or an aluminum alloy foil, so as to reduce weight. The resin layer may be, for example, a polymeric material such as polypropylene (PP), polyethylene (PE), nylon, or polyethylene terephthalate (PET). The laminate film may be heat-sealed to be formed into the shape of a container member.

The metal case is made of aluminum or an aluminum alloy, for example. As the aluminum alloy, an alloy including one or more of an element such as magnesium, zinc, or silicon is preferable. If a transition metal such as iron, copper, nickel, or chromium is included in the alloy, the included amount thereof is preferably set to 100 ppm or less.

2) Negative Electrode

The negative electrode may include a negative electrode current collector, and a negative electrode layer formed on one of the faces or both of reverse faces of the negative electrode current collector.

The negative electrode current collector is preferably an aluminum foil or an aluminum alloy foil including an element such as Mg, Ti, Zn, Mn, Fe, Cu, or Si, which are foils electrochemically stable in a potential range higher than 1 V (vs. $Li/Li^+$). Such an aluminum foil or an aluminum alloy foil is capable of preventing the negative electrode current collector from being dissolved or deteriorated due to corrosion in an over-discharge cycle.

Thickness of the aluminum foil or the aluminum alloy foil is 20 µm or less, and more preferably 15 µm or less. Purity of the aluminum foil is preferably 99% or higher. The aluminum alloy is preferably an alloy including one or more of elements such as magnesium, zinc, and silicon. On the other hand, it is preferred that an included amount of transition metal such as iron, copper, nickel or chromium be 1% or less.

The negative electrode layer may include a negative electrode active material, a conductive agent, and a binder.

The active material according to the first embodiment may be included in the negative electrode active material. The negative electrode active material may include a negative electrode active material other than the active material according to the first embodiment, as set forth in the description of the first embodiment. The active material included in the negative electrode active material may be one kind or two or more kinds.

The negative electrode active material preferably has a specific surface area of from 0.5 m$^2$/g to 50 m$^2$/g. When the specific surface area is 0.5 m$^2$/g or more, it becomes possible to secure sufficient insertion-extraction sites for Li ion. When the specific surface area is 50 m$^2$/g or less, handling becomes easy in industrial production. More preferably, the specific surface area is from 3 m$^2$/g to 30 m$^2$/g.

The conductive agent can improve a current-collecting performance of the negative electrode active material, and can suppress contact resistance between the active material and the current collector. As the conductive agent, those that may be used are, for example, a carbon material, a metal powder such an aluminum powder, or a conductive ceramics such as TiO. Examples of the carbon materials may include acetylene black, carbon black, cokes, carbon fibers, or graphite. More preferred are powders of cokes, graphite, and TiO having an average particle size of 10 µm or less, or carbon fibers having an average particle size of 1 µm or less, which have a heat treatment temperature of from 800 to 2000° C. The carbon material preferably has a BET specific surface area by an N$_2$ adsorption of 10 m$^2$/g or more. One of the above described materials may be included as the conductive agent, or two or more may be included in combination as the conductive agent.

The binder can bind the negative electrode active material and the conductive agent together. Examples of the binder include polytetrafluoroethylene (PTFE), polyvinylidene fluoride (PVdF), fluorine rubber, styrene-butadiene rubber, and polyacrylic acid compounds. One of these may be included as the binder, or two or more may be included in combination as the binder.

The negative electrode active material, conductive agent and binder in the negative electrode layer are preferably blended in proportions of 70% by mass to 96% by mass, 2% by mass to 28% by mass, and 2% by mass to 28% by mass, respectively. When the amount of conductive agent is 2% by mass or more, the current collection performance of the negative electrode layer can be improved, to thus improve the large-current performance of the nonaqueous electrolyte battery. When the amount of binder is 2% by mass or more, binding between the negative electrode layer and current collector becomes high, and cycling performance improves. On the other hand, an amount of each of the conductive agent and binder is preferably 28% by mass or less, in view of increasing the capacity.

The negative electrode may be produced as follows, for example. A negative electrode active material, a conductive agent, and a binder are suspended in an ordinarily used solvent to prepare a slurry. Next the slurry is applied onto a current collector, and the applied coating is dried to form a negative electrode layer. Then, the current collector and the negative electrode layer thereon are subjected to pressing to thereby produce the negative electrode. The negative electrode may also be produced by forming a negative electrode active material, conductive agent, and binder into pellets as the negative electrode layer, and disposing the pellets onto a current collector.

3) Positive Electrode

The positive electrode may include a positive electrode current collector, and a positive electrode layer formed on one of the faces or both of reverse faces of the positive electrode current collector.

The positive electrode current collector is preferably, for example, an aluminum foil, or an aluminum alloy foil including an element such as Mg, Ti, Zn, Mn, Fe, Cu, or Si.

The positive electrode layer may include a positive electrode active material, a conductive agent, and a binder.

As the positive electrode active material, for example, oxides, polymers, or the like may be used. The positive electrode active material may include one kind or two or more kinds of the oxides, polymers, and the like.

Examples of the oxide, which may be used, include a manganese dioxide (MnO$_2$), iron oxides, copper oxides, and nickel oxides in each of which lithium is inserted, and lithium manganese composite oxides (e.g., Li$_x$Mn$_2$O$_4$ or Li$_x$MnO$_2$), lithium nickel composite oxides (e.g., lithium cobalt composite oxides (e.g., Li$_x$CoO$_2$), lithium nickel cobalt composite oxides (e.g., LiNi$_{1-y}$Co$_y$O$_2$), lithium manganese cobalt composite oxides (e.g., Li$_x$Mn$_y$Co$_{1-y}$O$_2$), lithium nickel manganese cobalt composite oxides (e.g., Li$_x$(Ni$_a$Mn$_b$Co$_c$)O$_2$, wherein a+b+c=1), lithium manganese nickel composite oxides having a spinel structure (e.g., Li$_x$Mn$_{2-y}$Ni$_y$O$_4$), lithium phosphorus oxides having an olivine structure (e.g., Li$_x$FePO$_4$, Li$_x$Fe$_{1-y}$Mn$_y$PO$_4$, and Li$_x$CoPO$_4$), iron sulfates (Fe$_2$(SO$_4$)$_3$), or vanadium oxides (e.g., V$_2$O$_5$), wherein the above noted x and y preferably satisfy 0<x≤1 and 0≤y≤1.

Examples of the polymer, which may be used, include conductive polymer materials such as polyaniline or polypyrrole, or disulfide-based polymers. Sulfur (S) or carbon fluoride may also be used as the active material.

Examples of preferred positive electrode active material include lithium manganese composite oxides (Li$_x$Mn$_2$O$_4$), lithium nickel composite oxides (Li$_x$NiO$_2$), lithium cobalt composite oxides (Li$_x$CoO$_2$), lithium nickel cobalt composite oxides (Li$_x$Ni$_{1-y}$Co$_y$O$_2$), lithium nickel manganese cobalt composite oxides (e.g., Li$_x$(Ni$_a$Mn$_b$Co$_c$)O$_2$, wherein a+b+c+=1), lithium manganese nickel composite oxides having a spinel structure (Li$_x$Mn$_{2-y}$Ni$_y$O$_4$), lithium manganese cobalt composite oxides (Li$_x$Mn$_y$Co$_{1-y}$O$_2$), and lithium iron phosphates (Li$_x$FePO$_4$), each of which have a high positive electrode voltage. The above noted x and y preferably satisfy 0<x≤1 and 0≤y≤1.

From a viewpoint of high temperature resistance, more preferable positive electrode active material is a lithium manganese composite oxide having a spinel structure (Li$_x$Mn$_2$O$_4$), a lithium nickel manganese cobalt composite oxide having a layered structure (i.e., Li$_x$(Ni$_a$Mn$_b$Co$_c$)O$_2$, wherein a+b+c=1), or a lithium iron phosphate having a olivine structure (Li$_x$FePO$_4$). These active materials have a high structural stability, and are excellent in reversibility of charge-and-discharge. Therefore, it is possible to obtain an even more improved life performance as well as an improved high temperature resistance by use of any of these active materials in combination with the negative electrode active material described above.

A nonaqueous electrolyte battery that includes a negative electrode including the active material according to the first embodiment, and a positive electrode of a lithium manganese composite oxide ($Li_xMn_2O_4$) or a positive electrode of a lithium nickel manganese cobalt composite oxide (e.g., $Li_x(Ni_aMn_bCo_c)O_2$, wherein a+b+c=1) is capable of forming a 12 V system which can exhibit an excellent compatibility with lead storage batteries, by having 5 cells connected in series. A nonaqueous electrolyte battery that includes a negative electrode including the active material according to the first embodiment, and a positive electrode of a lithium iron phosphate ($Li_xFePO_4$) is capable of forming a 12 V system which can exhibit an excellent compatibility with lead storage batteries, by having 6 cells connected in series. By such a configuration, it becomes possible to provide a battery module and a battery pack excellent in input-and-output performance and life performance.

The conductive agent is capable of improving current-collecting performance of the active material, and is capable of suppressing contact resistance between the active material and the current collector. Examples of the conductive agent include carbonaceous substances such as acetylene black, carbon black, or graphite.

The binder can bind the negative electrode active material and the conductive agent together. Examples of the binder include polytetrafluoroethylene (PTFE), polyvinylidene fluoride (PVdF), and fluorine rubber. One of these may be included as the binder, or two or more may be included in combination as the binder.

The positive electrode active material, the conductive agent, and the binder in the positive electrode layer are preferably included in proportions of from 80% by mass to 95% by mass, from 3% by mass to 18% by mass, and from 2% by mass to 17% by mass, respectively. By adjusting the amount of the conductive agent to be 3% by mass or more, it is possible to achieve the effect described above. By adjusting the amount of the conductive agent to be 18% by mass or less, it is possible to reduce decomposition of the nonaqueous electrolyte on the surface of the conductive agent during high temperature storage. By adjusting the amount of the binder to be 2% by mass or more, it is possible to obtain a sufficient positive electrode strength. By adjusting the amount of the binder to 17% by mass or less, it is possible to reduce the included amount of the binder, which is an insulating material, in the positive electrode, to thereby reduce the internal resistance.

The positive electrode may be produced as follows, for example. A positive electrode active material, a binder, and a conductive agent, which is added as necessary, are suspended in an appropriate solvent to prepare a slurry. Next, the slurry is applied to a positive electrode current collector, and the applied coating is dried to form a positive electrode layer. Then, the current collector and positive electrode layer thereon are subjected to pressing to form the positive electrode. The positive electrode may also be produced by forming an active material, a binder, and a conductive agent, which is added as necessary, into pellets as the positive electrode layer, and disposing the pellets onto a current collector.

4) Nonaqueous Electrolyte

For the nonaqueous electrolyte, there may be used, for example, a liquid nonaqueous electrolyte which is prepared by dissolving an electrolyte in an organic solvent, or gel-like nonaqueous electrolyte which is a composite of a liquid electrolyte and a polymer material.

The liquid nonaqueous electrolyte is preferably prepared by dissolving an electrolyte in an organic solvent at a concentration of from 0.5 M to 2.5 M.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), lithium bistrifluoromethylsulfonylimide [$LiN(CF_3SO_2)_2$], and mixtures thereof. The electrolyte is preferably resistant to oxidation even at a high potential, and most preferably $LiPF_6$.

Examples of the organic solvent include a cyclic carbonate such as propylene carbonate (PC), ethylene carbonate (EC), or vinylene carbonate (VC); a linear carbonate such as diethyl carbonate (DEC), dimethyl carbonate (DMC), or methyl ethyl carbonate (MEC); a cyclic ether such as tetrahydrofuran (THF), 2-methyl tetrahydrofuran (2-MeTHF), or dioxolane (DOX); a linear ether such as dimethoxy ethane (DME) or diethoxy ethane (DEE); and γ-butyrolactone (GBL), acetonitrile (AN), and sulfolane (SL). These organic solvents may be used singularly or as a mixed solvent.

Examples of the polymeric material include polyvinylidene fluoride (PVdF), polyacrylonitrile (PAN), and polyethylene oxide (PEO).

Preferred organic solvent is a mixed solvent prepared by mixing at least two or more selected from the group consisting of propylene carbonate (PC), ethylene carbonate (EC), or diethyl carbonate (DEC), or a mixed solvent including γ-butyrolactone (GBL). By use of any of these solvents, it is possible to obtain a nonaqueous electrolyte battery having an excellent high temperature performance.

5) Separator

As the separator, it is possible to use, for example, a porous film or a nonwoven fabric of synthetic resin that include polyethylene, polypropylene, cellulose, or polyvinylidene fluoride (PVdF). A preferred porous film is made of polyethylene or polypropylene. Such a film melts at a specific temperature, and is capable of insulating electric current, and therefore, is capable of enhancing safety.

6) Negative Electrode Terminal

For the negative electrode terminal, it is possible to use a material having electrical stability and conductivity, for example, at a potential in a range of from 1 V to 3 V (vs.$Li/Li^+$) relative to Li. Specific examples thereof include aluminum and aluminum alloys including an element such as Mg, Ti, Zn, Mn, Fe, Cu, or Si. The negative electrode terminal is preferably made of the same material as that of the negative electrode current collector, so as to reduce contact resistance with the negative electrode current collector.

7) Positive Electrode Terminal

For the positive electrode terminal, it is possible to use a material having electrical stability and conductivity, for example, at a potential in a range of from 3 V to 4.25 V (vs.$Li/Li^+$) relative to Li. Specific examples thereof include aluminum or aluminum alloys including an element such as Mg, Ti, Zn, Mn, Fe, Cu, or Si. The positive electrode terminal is preferably made of the same material as that of the positive electrode current collector, so as to reduce the contact resistance with the positive electrode current collector.

Next, an example of a nonaqueous electrolyte battery according to the second embodiment will be described with reference to the drawings.

Figure 2:
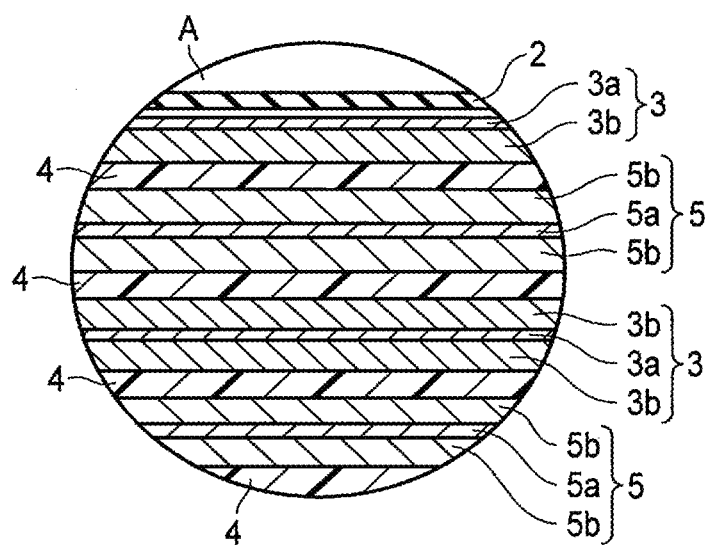
FIG. 2 is an enlarged cross-sectional view of part A of the nonaqueous electrolyte battery of FIG. 1.

FIG. 1 is a schematic cross-sectional view showing an example of the nonaqueous electrolyte battery according to the second embodiment. FIG. 2 is an enlarged cross-sectional view of part A of FIG. 1.

A nonaqueous electrolyte battery 100 shown in FIG. 1 and FIG. 2 includes a wound electrode group 1 with a flat shape.

The flat-shaped wound electrode group 1 includes a negative electrode 3, a separator 4, and a positive electrode 5, as shown in FIG. 2. The separator 4 is interjacent between the negative electrode 3 and the positive electrode 5. Such a flat-shaped wound electrode group 1 may be formed in such a manner that a layered stack formed with the negative electrode 3, the separator 4, the positive electrode 5, and another separator 4 being stacked, such that the separator 4 is interjacent between the negative electrode 3 and the positive electrode 5, is wound in a spiral manner with the negative electrode 3 disposed on the outer side, as shown in FIG. 2, and then press molded.

The negative electrode 3 includes a negative electrode current collector 3a and a negative electrode layer 3b. Of the negative electrode 3, in a part located in the outermost shell, the negative electrode layer 3b is formed on the negative electrode current collector 3a, only on the surface facing the center of the electrode group, as shown in FIG. 2. In the other parts of the negative electrode 3, the negative electrode layer 3b is formed on both of reverse surfaces of the negative electrode current collector 3a.

In the positive electrode 5, the positive electrode layers 5b is formed on both of reverse surfaces of the positive electrode current collector 5a.

As shown in FIG. 1, in the vicinity of the outer peripheral end of the wound electrode group 1, a negative electrode terminal 6 is connected to the negative electrode current collector 3a of the negative electrode 3 at the outermost shell, and the positive electrode terminal 7 is connected to the positive electrode current collector 5a of the positive electrode 5 at an inner side.

The wound electrode group 1 is housed in a bag-shaped container 2 made of a laminate film including two resin layers and a metal layer that is interjacent between the resin layers.

The negative electrode terminal 6 and the positive electrode terminal 7 are extended outside from an opening part of the bag-shaped container 2. For example, a liquid nonaqueous electrolyte is inserted via the opening part of the bag-shaped container 2, and housed in the bag-shaped container 2.

In the bag-shaped container 2, the opening part is heat sealed with each of the negative electrode terminal 6 and the positive electrode terminal 7 being sandwiched by the laminate film, such that the wound electrode group 1 and the liquid nonaqueous electrolyte are fully sealed in.

The nonaqueous electrolyte battery according to the second embodiment as explained above includes the active material according to the first embodiment. Thus, the nonaqueous electrolyte battery according to the second embodiment can exhibit excellent input-and-output performance, as well as excellent life performance, and also have a high energy density.

In addition, when the nonaqueous electrolyte battery is, for example, combined with a 12 V lead storage battery for automobiles to thereby construct a motor assist type hybrid car or an idle reduction system, it is possible to design a setting of battery pack voltage that is capable of preventing over-discharge of a lead storage battery upon a high load or is capable of adapting to a voltage fluctuation upon an input of regenerative energy. This is because, in the end period of discharge of the nonaqueous electrolyte battery of the second embodiment, the decrease in voltage is smooth and moderate. Since the voltage changes smoothly in accordance with the charge-and-discharge of the nonaqueous electrolyte battery, the state-of-charge (SOC) can be managed based on the voltage change. Accordingly, the voltage in the end period of discharge can be easily managed, and the nonaqueous electrolyte battery can be favorably used in a system where the battery is combined with the lead storage battery.

Further, in the case where a spinel lithium titanate ($Li_4Ti_5O_{12}$) is used for the negative electrode, the average operating potential is low. Thus, it is necessary to connect six batteries in series, in order to obtain a voltage compatible with a lead storage battery for automobiles. On the other hand, when the active material of the first embodiment is used as the negative electrode active material, the average operating potential of the negative electrode is decreased, and the battery voltage is increased. Thus, even if the number of the batteries connected in series in the battery pack is changed to five, a battery pack capable of exhibiting a voltage compatible with the 12 V lead storage battery for automobiles can be constructed. Hence, the nonaqueous electrolyte battery according to the second embodiment is able to provide a small size battery pack capable of exhibiting a low resistance and a high energy density at a low cost.

Third Embodiment

According to the third embodiment, a battery module is provided. The battery module according to the third embodiment includes a plural number of the nonaqueous electrolyte battery according to the second embodiment.

In the battery module according to the third embodiment, each unit cell may be disposed being electrically connected in series or in parallel, and may also be disposed in a combination of connections in series and in parallel.

For example, the battery module according to the third embodiment may include 6 m cells of nonaqueous electrolyte batteries that include a negative electrode including the active material according to the first embodiment, a positive electrode that includes an iron-including phosphate compound having an olivine structure, and a nonaqueous electrolyte. As used herein, m is an integer of 1 or more. The 6 m cells of nonaqueous electrolyte batteries may be connected in series to structure a battery module. As described in the second embodiment, the nonaqueous electrolyte batteries which may be included in the battery module of this example can compose a 12 V system capable of exhibiting an excellent compatibility with a lead storage battery, with 6 cells connected in series.

For example, the battery module according to the third embodiment may include 5 n cells of nonaqueous electrolyte batteries that include a negative electrode including the active material according to the first embodiment, a positive electrode including at least one selected from the group consisting of a lithium manganese composite oxide having a spinel structure and a lithium nickel manganese cobalt composite oxide having a layered structure, and a nonaqueous electrolyte. As used herein, n is an integer of 1 or more. The 5 n cells of nonaqueous electrolyte batteries may be connected in series to structure a battery module. As described in the second embodiment, the nonaqueous electrolyte batteries which may be included in the battery module of this example can compose a 12 V system capable of exhibiting an excellent compatibility with a lead storage battery, with 5 cells connected in series.

As described above, the battery module is capable of composing a 12 V system which is excellent in compatibility with a lead storage battery. Therefore, the battery module can suitably be used for a battery installed on a vehicle. Here, examples of the vehicle in which the battery module is installed include two- to four-wheeled automobiles in which an idle reduction system is installed, two- to four-wheeled hybrid electric automobiles, two- to four-wheeled electric automobiles, and power-assisted bicycles. The battery module may be positioned, for example, in an engine room of an automobile.

Next, an example of the battery module according to the third embodiment will be described with reference to the drawing.

FIG. 3 is a schematic perspective view showing an example of the battery module according to the third embodiment. A battery module 23 shown in FIG. 3 includes five unit cells 21. Each of the five unit cells 21 is a square-shaped nonaqueous electrolyte battery which is an example according to the second embodiment.

The battery module 23 shown in FIG. 3 further includes four leads 20. A lead 20 connects a negative electrode terminal 6 of a unit cell 21 with a positive electrode terminal 7 of another unit cell 21. In this manner, five unit cells 21 are connected in series with four leads 20. Namely, the battery module 23 of FIG. 3 is a battery module of 5 cells connected in series.

As shown in FIG. 3, a unit cell 21 of the five unit cells 21 has a positive electrode terminal 7 connected to a positive electrode-side lead 28 for an external connection. Another unit cell 21 of the five unit cells 21 has a negative electrode terminal 6 connected to a negative electrode-side lead 30 for an external connection.

The battery module according to the third embodiment includes the nonaqueous electrolyte battery according to the second embodiment. Thus, the battery module according to the third embodiment can exhibit excellent input-and-output performance, as well as excellent life performance, and also has a high energy density.

Fourth Embodiment

According to a fourth embodiment, a battery pack is provided. The battery pack includes the nonaqueous electrolyte battery according to the second embodiment.

The battery pack according to the fourth embodiment may include one or more nonaqueous electrolyte batteries (unit cells) according to the second embodiment described above. The plural nonaqueous electrolyte batteries, which may be included in the battery pack according to the fourth embodiment, may be electrically connected in series, in parallel, or in a combination of in series and in parallel. The plural nonaqueous electrolyte batteries may be electrically connected in series or in parallel, to structure a battery module. The battery pack according to the fourth embodiment may include plural battery modules. The battery module included in the battery pack according to the fourth embodiment may be, for example, the battery module according to the third embodiment.

The battery pack according to the fourth embodiment may further include a protective circuit. The protective circuit has a function to control charging and discharging of the nonaqueous electrolyte battery. Alternatively, a circuit included in equipment where the battery pack serves as a power source (for example, electronic devices, vehicles, and the like) may be used as the protective circuit for the battery pack.

Moreover, the battery pack according to the fourth embodiment may further include an external power distribution terminal. The external power distribution terminal is configured to externally output current from the nonaqueous electrolyte battery, and to input current to the nonaqueous electrolyte battery. In other words, when the battery pack is used as a power source, the current is externally provided via the external power distribution terminal. When the battery pack is charged, the charging current (including regenerative energy caused by power of vehicles such as automobiles) is provided to the battery pack via the external power distribution terminal.

Next, an example of a battery pack according to the fourth embodiment will be described with reference to the drawings.

Figure 4:
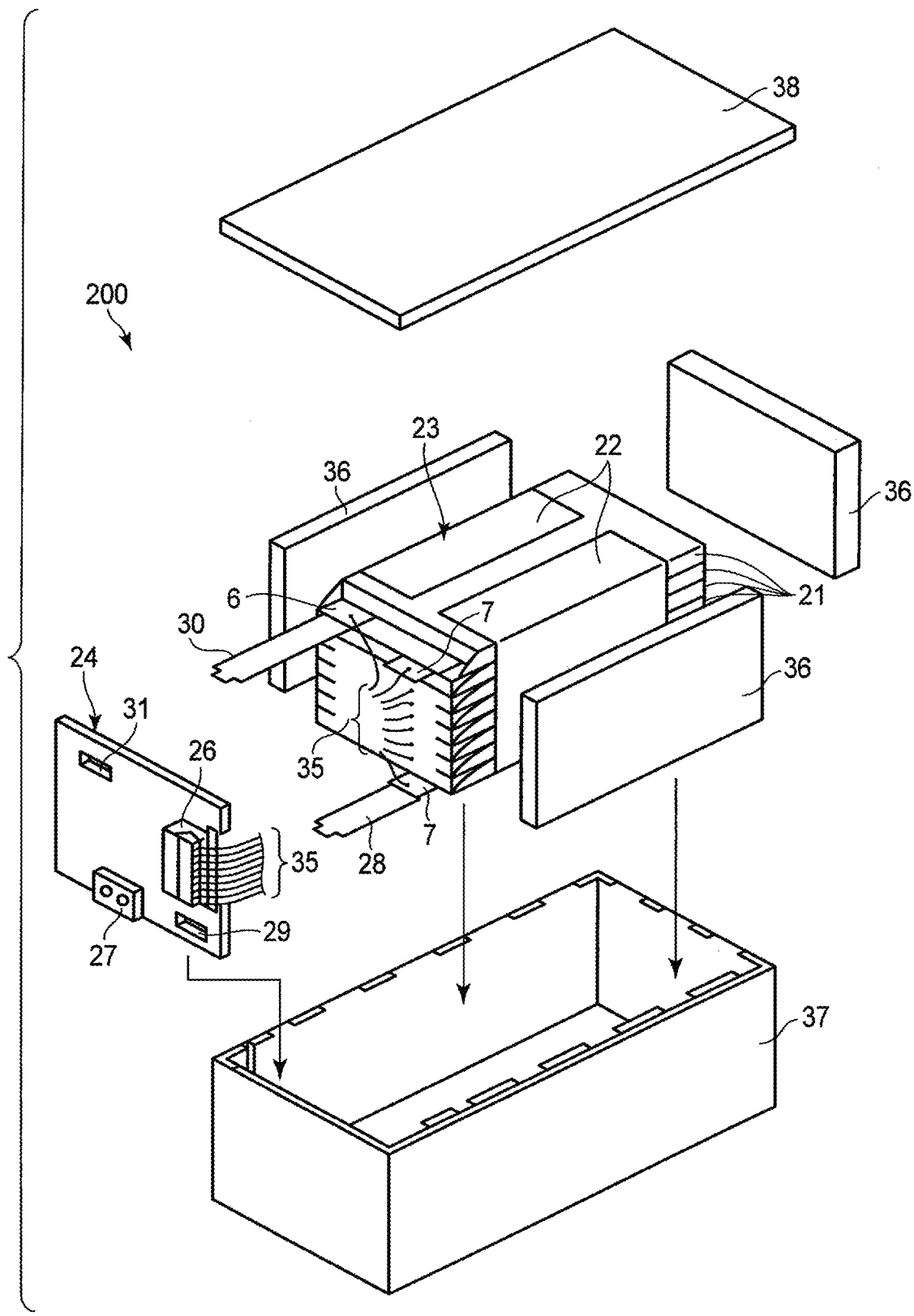
FIG. 4 is an exploded perspective view showing an example of a battery pack according to a fourth embodiment.

FIG. 4 is an exploded perspective view of an example of the battery pack according to the fourth embodiment.

Figure 5:
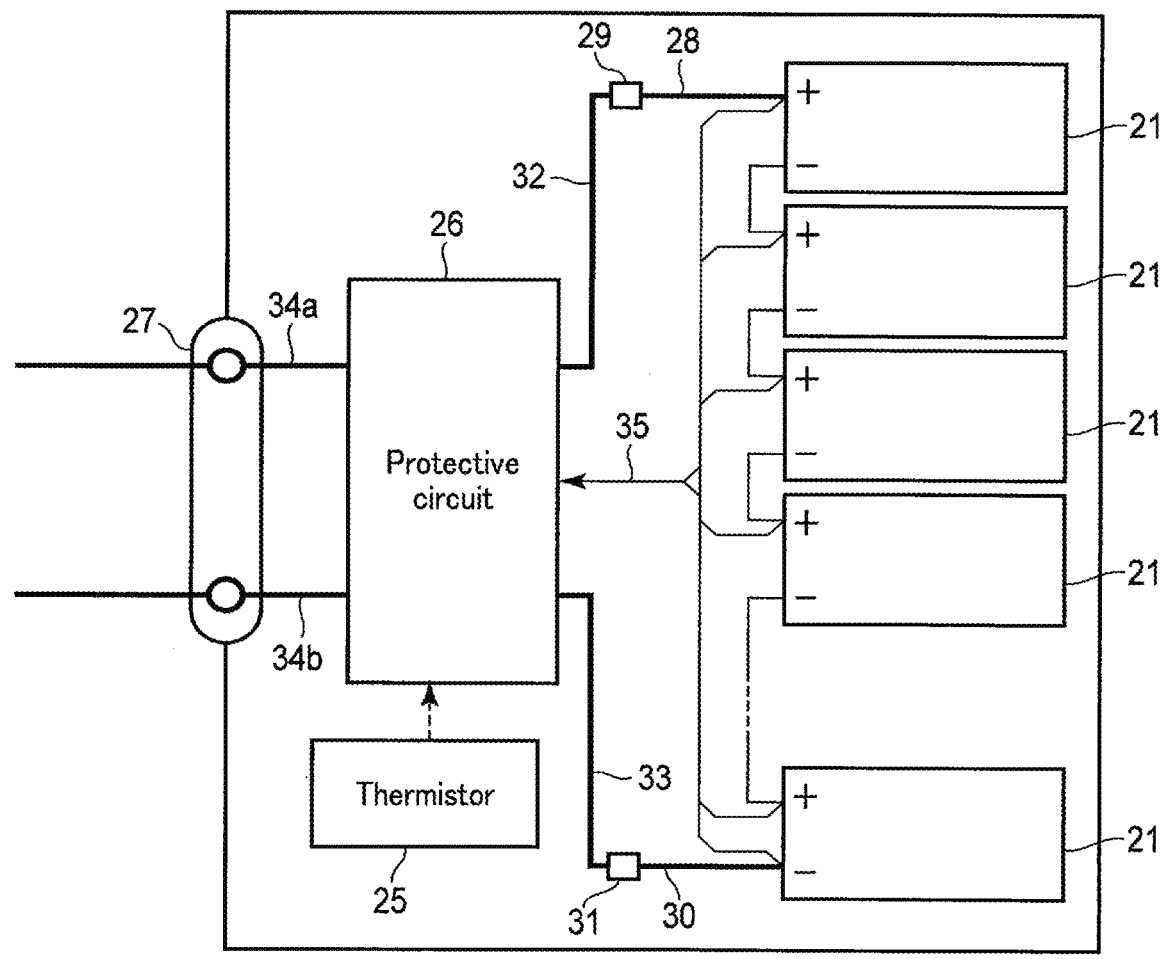
FIG. 5 is a block diagram showing an electric circuit of the battery pack of FIG. 4.

FIG. 5 is a block diagram showing an electric circuit of the battery pack of FIG. 4.

A battery pack 200 shown in FIGS. 4 and 5 includes a plural number of flat cells 21 each having a structure shown in FIGS. 1 and 2. In other words, the battery pack 200 shown in FIGS. 4 and 5 includes a plural number of an example of the nonaqueous electrolyte battery according to the first embodiment.

Plural unit cells 21 are stacked so that the negative electrode terminals 6 and the positive electrode terminals 7 extended outside are arranged in the same direction, and fastened with an adhesive tape 22 to thus configure a battery module 23. The unit cells 21 are electrically connected to each other in series as shown in FIG. 5.

A printed wiring board 24 is disposed facing toward the side plane where the negative electrode terminal 6 and the positive electrode terminal 7 of the plural unit cells 21 extend out from. A thermistor 25, a protective circuit 26, and an external power distribution terminal 27 are installed on the printed wiring board 24 as shown in FIG. 5. An electric insulating plate (not shown) is attached to the surface of the printed wiring board 24 facing the battery module 23 to avoid unnecessary connection with the wires of the battery module 23.

A positive electrode-side lead 28 is connected to the positive electrode terminal 7 of the unit cell 21 located at the bottom layer of the battery module 23, and the distal end of the lead 28 is inserted into a positive electrode-side connector 29 of the printed wiring board 24 so as to be electrically connected. A negative electrode-side lead 30 is connected to the negative electrode terminal 6 of the unit cell 21 located at the top layer of the battery module 23, and the distal end of the lead 30 is inserted into an negative electrode-side connector 31 of the printed wiring board 24 so as to be electrically connected. The connectors 29 and 31 are respectively connected to the protective circuit 26 through wires 32 and 33 formed on the printed wiring board 24.

The thermistor 25 detects the temperature of each of the unit cells 21, and sends the detection signal to the protective circuit 26. The protective circuit 26 can shut down a plus-side wire 34a and a minus-side wire 34b between the protective circuit 26 and the external power distribution terminal 27, under a predetermined condition. The predetermined condition indicates, for example, the case where a signal is received from the thermistor 25 indicating that the temperature of the unit cells 21 is of a predetermined temperature or more. Another example of the predetermined condition is when over-charge, over-discharge, or over-current of the unit cells 21 is detected. The detection of the over-charge and the like is performed on each of the unit cells 21 or all of the unit cells 21 as a whole. When each of the unit cells 21 is detected, the cell voltage may be detected, or positive electrode or negative electrode potential may be detected. In the latter case, a lithium electrode to be used as a reference electrode is inserted into each of the unit cells 21. In the case of the battery pack 200 of FIGS. 4 and 5, wires 35 for voltage detection are connected to each of the unit cells 21. Detection signals are sent to the protective circuit 26 through the wires 35.

Protective sheets 36 made of rubber or resin are arranged on three side planes of the battery module 23 except the side plane from which the positive electrode terminal 7 and the negative electrode terminal 6 protrude out.

The battery module 23 is, housed in a housing container 37 together with each of the protective sheets 36 and the printed wiring board 24. That is, the protective sheets 36 are arranged on both internal surfaces along a long side direction and on one internal surface along a short side direction of the housing container 37. The printed wiring board 24 is arranged on the internal surface on the opposite side along a short side direction. The battery module 23 is located in a space surrounded by the protective sheets 36 and the printed wiring board 24. A lid 38 is attached to the upper surface of the housing container 37.

In order to fix the battery module 23, a heat-shrinkable tape may be used in place of the adhesive tape 22. In this case, the battery module is bound by placing the protective sheets on the both sides of the battery module, revolving the heat-shrinkable tape around the battery module and protective sheets, and thermally shrinking the heat-shrinkable tape.

The battery pack 200 shown in FIGS. 4 and 5 has an embodiment where plural unit cells 21 are connected in series; however, in the battery pack according to the fourth embodiment, the plural unit cells 21 may be connected in parallel in order to increase battery capacity. Alternatively, plural unit cells connected in a combination of connection in series and connection in parallel may be included in the battery pack according to the fourth embodiment. Assembled battery packs 200 may be connected further in series and/or in parallel.

Furthermore, although the battery pack 200 shown in FIGS. 4 and 5 include plural unit cells 21, the battery pack according to the fourth embodiment may include only one unit cell 21.

The aspect of the battery pack may be appropriately changed depending on its application. The battery pack according to the embodiment can be suitably used in applications in which cycle performance is demanded to be excellent when large current is taken out. Specifically the battery pack is used as a power source of a digital camera, as a battery for installing on a vehicle such as, for example, a two- to four-wheeled hybrid electric automobile, a two- to four-wheeled electric automobile, or a power-assisted bicycle, as a stationary battery, or as a battery for installing on rail way cars. In particular, the battery pack is suitably used for a battery installed on a vehicle. The battery pack may be, for example positioned in an engine room of an automobile.

In a vehicle, such as an automobile, to which the battery pack according to the fourth embodiment has been installed, the battery pack is configured, for example, to recover regenerative energy caused by power of the vehicle. Examples of the vehicle include two to four-wheeled hybrid electric automobiles, two to four-wheeled electric automobiles, power-assisted bicycles, and rail way cars such as electric trains.

Figure 9:
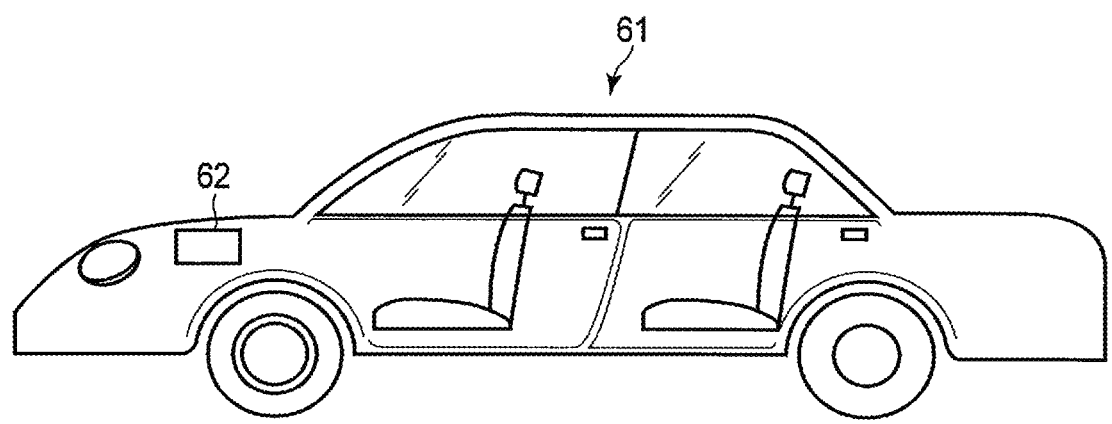
FIG. 9 is a schematic view showing an example of an automobile including the battery pack according to the Fourth Embodiment.

FIG. 9 shows an example of an automobile that includes a battery pack according to the fourth embodiment.

The automobile 61 shown in FIG. 9 includes a battery pack 62, which is an example of the battery pack according to the fourth embodiment, installed in its engine room. The installing position is not limited to engine rooms. For example, the battery pack may also be positioned in rear parts of automobiles or under seats.

The battery pack according to the fourth embodiment includes the nonaqueous electrolyte battery according to the second embodiment. Thus, the battery pack according to the fourth embodiment can exhibit excellent input-and-output performance, as well as excellent life performance, and also has a high energy density.

Furthermore, since the battery pack includes the nonaqueous electrolyte battery according to the second embodiment, decrease of voltage is smooth during the end period of discharge for the battery pack. Thus, SOC (state of charge) of the battery pack can be managed based on voltage change, and therefore, voltage management at the end period of discharge can be performed easily.

EXAMPLES

Hereinbelow, Examples will be described, but the present invention is not limited to the examples described below, so long as the invention does not depart from the spirit of the present invention.

Example 1

In Example 1, a beaker cell of the Example 1 was produced by the following procedure.

<Preparation of Active Material>

To synthesize a main phase composition as described in Table 1, lithium carbonate ($Li_2CO_3$), sodium carbonate ($Na_2CO_3$), and titanium dioxide ($TiO_2$) having an anatase structure were mixed together at a molar ratio of 1:1:6 as described in Table 2. The mixture was subjected to a provisional calcination in a muffle furnace at 650° C. over a span of 2 hours, and at 800° C. over a span of 12 hours. Then, the provisionally calcined product was ground with a grinder to resolve aggregation. In the next place, the provisionally calcined product was heated in a muffle furnace at 950° C. over a span of 12 hours, to perform a main calcination and an evaporation treatment of alkali elements, so that a conversion into a nanocomposite (production of a second phase) was accelerated. After the heating, the calcined product was promptly taken out from the furnace, and put into a liquid nitrogen so as to be rapidly cooled. Thus, the active material of Example 1 was obtained.

<Production of Electrode>

The active material of Example 1, acetylene black as a conductive agent, and polyvinylidene fluoride (PVdF) as a binder were added to N-methyl-2-pyrrolidone (NMP) and mixed together to prepare a slurry. At this time, mass ratio of the active material:acetylene black:PVdF was set to 90:5:5. The slurry was applied to both of reverse surfaces of a current collector made of an aluminum foil having a thickness of 12 μm. The applied coating of the slurry was dried, and thus, an active material layer was obtained. Subsequently, the current collector and the active material layer were pressed, and thus the electrode of Example 1 was obtained. Here, the electrode density without including the current collector, that is, a density of the active material layer was 2.2 g/cm³.

<Preparation of Liquid Nonaqueous Electrolyte>

Ethylene carbonate (EC) and diethyl carbonate (DEC) were mixed together at a ratio by volume of 1:2 to produce a mixed solvent. Into the mixed solvent, $LiPF_6$ as an electrolyte was dissolved at a concentration of 1 M, and thus, a liquid nonaqueous electrolyte was obtained.

<Production of Beaker Cell>

A beaker cell was produced using the electrode produced above as a working electrode, and lithium metal as counter electrode and reference electrode. The liquid nonaqueous electrolyte obtained above was poured into the beaker cell, thereby completing the beaker cell of Example 1.

Example 2

In Example 2, first, an active material was produced by the same method as that of the Example 1. This active material was then subjected to a heat treatment at 600° C. for 6 hours, then promptly taken out from the furnace, and put in a liquid nitrogen so as to be rapidly cooled, so that the titanium dioxide in the nanocomposite phase was transformed into anatase-type. Thereby, the active material of Example 2 was obtained.

A beaker cell of Example 2 was produced in the same manner as in Example 1, except that the obtained active material was used.

Examples 3 and 4

In each of Examples 3 and 4, an active material was synthesized with the objective of obtaining as the main phase of the active materials, a phase of a compound equivalent to a titanium-including composite oxide represented by a general formula $Li_2Na_2Ti_6O_{14}$ having vacancies introduced into the crystal structure belonging to a space group Fmmm thereof, by introduction of substituting elements. Specifically, the active materials of the Examples 3 and 4 were obtained by the same synthesis method as that of the Example 1, except for using the raw materials and the raw material mixing ratio described in Table 2, so that the main phase would have the composition shown in Table 1, in order to introduce vacancies in a part of Na sites.

Beaker cells of the Examples 3 and 4 were produced in the same manner as in Example 1, except that the obtained active material was respectively used.

Examples 5 and 6

In each of Examples 5 and 6, first, an active material was synthesized by the same method as that of Example 4. Next, in order to increase the amount of titanium dioxide, the active material was further subjected to a high temperature heating, and a subsequent rapid cooling. Specifically, in Example 5, the active material was heated at 950° C. for 3 hours, and then rapidly cooled, and thus, an active material of Example 5 was obtained. In Example 6, the active material was heated at 950° C. for 12 hours, and then rapidly cooled, and thus, an active material of Example 6 was obtained.

Beaker cells of Examples 5 and 6 were produced in the same manner as in Example 1, except that the obtained active material was respectively used.

Example 7

In Example 7, first, an active material was synthesized by the same method as in Example 6. Then, 100 g of the active material powder was mixed with 10 g of maltose. Subsequently, the mixture was thoroughly dispersed using a stirrer. Thereafter, the mixture was dried by evaporation. In this manner, a composite was obtained, where the particle surface of an active material was coated with an organic substance.

Subsequently, the composite thus obtained was calcined at a temperature of 500° C. for one hour in an inert atmosphere under argon flow, thereby carrying out carbonization heat treatment. By the carbonization heat treatment, the organic substance was carbonized. In this manner, the active material of Example 7 was obtained.

The beaker cell of Example 7 was produced in the same manner as in Example 1, except that the composite oxide of Example 7 was used as the active material.

Example 8

In Example 8, first, an active material was produced by the same method as that of Example 4. The active material was then heated at a temperature of 800° C. for 1 hour in a reduced atmosphere, while flowing with a nitrogen gas including 3% of hydrogen. In this manner, an active material including as a compound of main phase, a titanium-including composite oxide having the composition described in Table 1, was synthesized, by subjecting a part of oxide ions in the main phase of the active material to oxidative reduction. Thus, the active material of Example 8 was obtained.

A beaker cell of Example 8 was produced in the same manner as in Example 1, except that the obtained active material was used.

Examples 9 to 30

In each of Examples 9 to 30, synthesis was performed by the same procedure with that of the Example 1, except that the raw materials and the raw material mixing ratios described in Table 2 were used in order to synthesize the main phase compositions described in Table 1. Thus, the active materials of Examples 9 to 30 were obtained.

Beaker cells of Examples 9 to 30 were produced in the same manner as in Example 1, except that the obtained active materials were used.

Comparative Examples 1 to 3

The active materials of Comparative Examples 1 to 3 were synthesized by the following method.

First, as the starting material, the commercially available oxide and carbonate reagent described in Table 2 were prepared in such a manner that the molar ratio described in Table 1 is satisfied, and the total weight would be 50 g. In a preliminary experiment, the amount of lithium ion vaporization during calcination was analyzed, and vaporization corresponding to 3% lithium carbonate was observed. Therefore, lithium carbonate was prepared 3% in excess of the target composition.

Subsequently, the starting materials prepared as described above were mixed, and the mixture was poured into an agate pod for ball milling (capacity: 300 mL). Agate balls having diameters of 10 mm and 5 mm were placed in the pod in a number ratio of 1:1 and filling one third of the pod capacity. Thereafter, 50 mL of ethanol was placed in the pod, and wet-mixing was carried out at 120 rpm for 60 minutes, thereby obtaining a mixture.

In the next step, the mixture thus obtained was placed in an electric furnace, and subjected to heat treatment by the following method.

First, provisional calcination was carried out at a temperature of 650° C. for 6 hours in air. Subsequently, the powder obtained after provisional calcination was taken out from the furnace, reground, and further mixed.

The mixture thus obtained was subsequently subjected to first calcination at a temperature of 900° C. for 6 hours. After calcination, the calcined powder was taken out from the furnace, and the calcined powder was remixed.

Subsequently, the remixed calcined powder was placed in the furnace, and subjected to second calcination in the air at a temperature of 900° C. for 6 hours. Thereafter, the temperature in the electric furnace was maintained at 400° C. for 2 hours, and then promptly cooled to room temperature. Next, the calcined powder was taken out from the furnace, and the calcined powder was remixed. The powder obtained after the second calcination, i.e., as a result of calcination at a temperature of 900° C. for a total of 12 hours, was respectively used as the active material of Comparative Examples 1 to 3.

In addition, the beaker cells of Comparative Examples 1 to 3 were produced in the same manner as in Example 1, except that the active material of Comparative Examples 1 to 3 was respectively used.

Comparative Example 4

In Comparative Example 4, a beaker cell of Comparative Example 4 was produced by the following procedure.

Lithium carbonate ($Li_2CO_3$), sodium carbonate ($Na_2CO_3$), and titanium dioxide ($TiO_2$) having an anatase structure were mixed together at a molar ratio of 1:1:6.4. The mixture was calcined at 800° C. over a span of 3 hours. Then, the calcined product was ground with a grinder to resolve aggregation. Thus, the active material of Example 4 was obtained.

A beaker cell of Comparative Example 4 was produced in the same manner as in Example 1, except that the obtained active material was used.

TABLE 2

| | Li source/amount | M1 source/amount | Ti source/amount | M2 source/amount |
|---|---|---|---|---|
| Comparative Example 1 | $Li_2CO_3$/1.0 | $Na_2CO_3$/1.0 | $TiO_2$/6.0 | — |
| Comparative Example 2 | $Li_2CO_3$/1.0 | $SrCO_3$/1.0 | $TiO_2$/6.0 | — |
| Comparative Example 3 | $Li_2CO_3$/1.0 | $Na_2CO_3$/0.75 | $TiO_2$/5.5 | $Nb_2O_5$/0.25 |
| Comparative Example 4 | $Li_2CO_3$/1.0 | $Na_2CO_3$/1.0 | $TiO_2$/6.4 | — |
| Example 1 | $Li_2CO_3$/1.0 | $Na_2CO_3$/1.0 | $TiO_2$/6.0 | — |
| Example 2 | $Li_2CO_3$/1.0 | $Na_2CO_3$/1.0 | $TiO_2$/6.0 | — |
| Example 3 | $Li_2CO_3$/1.0 | $Na_2CO_3$/0.995 | $TiO_2$/5.99 | $Nb_2O_5$/0.005 |
| Example 4 | $Li_2CO_3$/1.0 | $Na_2CO_3$/0.75 | $TiO_2$/5.5 | $Nb_2O_5$/0.25 |
| Example 5 | $Li_2CO_3$/1.0 | $Na_2CO_3$/0.75 | $TiO_2$/5.5 | $Nb_2O_5$/0.25 |
| Example 6 | $Li_2CO_3$/1.0 | $Na_2CO_3$/0.75 | $TiO_2$/5.5 | $Nb_2O_5$/0.25 |
| Example 7 | $Li_2CO_3$/1.0 | $Na_2CO_3$/0.75 | $TiO_2$/5.5 | $Nb_2O_5$/0.25 |
| Example 8 | $Li_2CO_3$/1.0 | $Na_2CO_3$/0.75 | $TiO_2$/5.5 | $Nb_2O_5$/0.25 |
| Example 9 | $Li_2CO_3$/1.0 | $Na_2CO_3$/0.505 | $TiO_2$/5.01 | $Nb_2O_5$/0.495 |
| Example 10 | $Li_2CO_3$/1.0 | $SrCO_3$/0.5 $Na_2CO_3$/0.25 | $TiO_2$/5.5 | $Nb_2O_5$/0.5 |
| Example 11 | $Li_2CO_3$/1.0 | $SrCO_3$/0.1 | $TiO_2$/4.2 | $Nb_2O_5$/0.9 |
| Example 12 | $Li_2CO_3$/1.0 | $MgCO_3$/0.5 $Na_2CO_3$/0.25 | $TiO_2$/5.5 | $Nb_2O_5$/0.25 |
| Example 13 | $Li_2CO_3$/1.0 | $CaCO_3$/0.5 $Na_2CO_3$/0.25 | $TiO_2$/5.5 | $Nb_2O_5$/0.25 |
| Example 14 | $Li_2CO_3$/1.0 | $BaCO_3$/0.5 $Na_2CO_3$/0.25 | $TiO_2$/5.5 | $Nb_2O_5$/0.25 |
| Example 15 | $Li_2CO_3$/1.0 | $Cs_2CO_3$/0.05 $Na_2CO_3$/0.7 | $TiO_2$/5.5 | $Nb_2O_5$/0.25 |
| Example 16 | $Li_2CO_3$/1.0 | $Rb_2CO_3$/0.05 $Na_2CO_3$/0.7 | $TiO_2$/5.5 | $Nb_2O_5$/0.25 |
| Example 17 | $Li_2CO_3$/1.0 | $K_2CO_3$/0.05 $Na_2CO_3$/0.7 | $TiO_2$/5.5 | $Nb_2O_5$/0.25 |

TABLE 1

| | Main phase composition | Second phase composition | a | b | c | d | δ |
|---|---|---|---|---|---|---|---|
| Comparative Example 1 | $Li_2Na_2Ti_6O_{14}$ | — | 0 | 0 | 0 | 0 | 0 |
| Comparative Example 2 | $Li_2SrTi_6O_{14}$ | — | 0 | 1.0 | 0 | 0 | 0 |
| Comparative Example 3 | $Li_2Na_{1.5}Ti_{5.5}Nb_{0.5}O_{14}$ | — | 0 | 0.5 | 0.5 | 0.5 | 0 |
| Comparative Example 4 | $Li_2Na_2Ti_6O_{14}$ | $TiO_2$ | 0 | 0 | 0 | 0 | 0 |
| Example 1 | $Li_2Na_2Ti_6O_{14}$ | $TiO_2$ | 0 | 0 | 0 | 0 | 0 |
| Example 2 | $Li_2Na_2Ti_6O_{14}$ | $TiO_2$ | 0 | 0 | 0 | 0 | 0 |
| Example 3 | $Li_2Na_{1.99}Ti_{5.99}Nb_{0.01}O_{14}$ | $TiO_2$ | 0 | 0.01 | 0.01 | 0.01 | 0 |
| Example 4 | $Li_2Na_{1.5}Ti_{5.5}Nb_{0.5}O_{14}$ | $TiO_2$ | 0 | 0.5 | 0.5 | 0.5 | 0 |
| Example 5 | $Li_2Na_{1.5}Ti_{5.5}Nb_{0.5}O_{14}$ | $TiO_2$ | 0 | 0.5 | 0.5 | 0.5 | 0 |
| Example 6 | $Li_2Na_{1.5}Ti_{5.5}Nb_{0.5}O_{14}$ | $TiO_2$ | 0 | 0.5 | 0.5 | 0.5 | 0 |
| Example 7 | $Li_2Na_{1.5}Ti_{5.5}Nb_{0.5}O_{14}$ | $TiO_2$ | 0 | 0.5 | 0.5 | 0.5 | 0 |
| Example 8 | $Li_2Na_{1.5}Ti_{5.5}Nb_{0.5}O_{13.5}$ | $TiO_2$ | 0 | 0.5 | 0.5 | 0.5 | −0.5 |
| Example 9 | $Li_2Na_{1.01}Ti_{5.01}Nb_{0.99}O_{14}$ | $TiO_2$ | 0 | 0.99 | 0.99 | 0.99 | 0 |
| Example 10 | $Li_2(Sr_{0.50}Na_{0.50})Ti_{5.5}Nb_{0.50}O_{14}$ | $TiO_2$ | 0 | 1.0 | 0.5 | 0.5 | 0 |
| Example 11 | $Li_2Sr_{0.1}Ti_{4.20}Nb_{1.80}O_{14}$ | $TiO_2$ | 0 | 1.9 | 0.8 | 1.8 | 0 |
| Example 12 | $Li_2(Mg_{0.5}Na_{0.50})Ti_{5.50}Nb_{0.50}O_{14}$ | $TiO_2$ | 0 | 1.0 | 0.5 | 0.5 | 0 |
| Example 13 | $Li_2(Ca_{0.5}Na_{0.50})Ti_{5.50}Nb_{0.50}O_{14}$ | $TiO_2$ | 0 | 1.0 | 0.5 | 0.5 | 0 |
| Example 14 | $Li_2(Ba_{0.5}Na_{0.50})Ti_{5.50}Nb_{0.50}O_{14}$ | $TiO_2$ | 0 | 1.0 | 0.5 | 0.5 | 0 |
| Example 15 | $Li_2Na_{1.4}Cs_{0.1}Ti_{5.5}Nb_{0.5}O_{14}$ | $TiO_2$ | 0 | 0.5 | 0.5 | 0.5 | 0 |
| Example 16 | $Li_2Na_{1.4}Rb_{0.1}Ti_{5.5}Nb_{0.5}O_{14}$ | $TiO_2$ | 0 | 0.5 | 0.5 | 0.5 | 0 |
| Example 17 | $Li_2Na_{1.4}K_{0.1}Ti_{5.5}Nb_{0.5}O_{14}$ | $TiO_2$ | 0 | 0.5 | 0.5 | 0.5 | 0 |
| Example 18 | $Li_2Na_2Ti_{0.1}Zr_{5.9}O_{14}$ | $TiO_2$ | 0 | 0 | 5.9 | 5.9 | 0 |
| Example 19 | $Li_2Na_{1.5}Ti_5Sn_{0.5}Nb_{0.5}O_{14}$ | $TiO_2$ | 0 | 0.5 | 1.0 | 1.0 | 0 |
| Example 20 | $Li_2Na_{1.5}Ti_{5.5}V_{0.1}Nb_{0.4}O_{14}$ | $TiO_2$ | 0 | 0.5 | 0.5 | 0.5 | 0 |
| Example 21 | $Li_2Na_{1.5}Ti_{5.5}Ta_{0.1}Nb_{0.4}O_{14}$ | $TiO_2$ | 0 | 0.5 | 0.5 | 0.5 | 0 |
| Example 22 | $Li_2Na_{1.4}Ti_{5.5}Mo_{0.1}Nb_{0.4}O_{14}$ | $TiO_2$ | 0 | 0.6 | 0.5 | 0.5 | 0 |
| Example 23 | $Li_2Na_{1.4}Ti_{5.5}W_{0.1}Nb_{0.4}O_{14}$ | $TiO_2$ | 0 | 0.6 | 0.5 | 0.5 | 0 |
| Example 24 | $Li_2Na_{1.7}Ti_{5.5}Y_{0.1}Nb_{0.4}O_{14}$ | $TiO_2$ | 0 | 0.3 | 0.5 | 0.5 | 0 |
| Example 25 | $Li_2Na_{1.7}Ti_{5.5}Fe_{0.1}Nb_{0.4}O_{14}$ | $TiO_2$ | 0 | 0.3 | 0.5 | 0.5 | 0 |
| Example 26 | $Li_2Na_{1.7}Ti_{5.5}Co_{0.1}Nb_{0.4}O_{14}$ | $TiO_2$ | 0 | 0.3 | 0.5 | 0.5 | 0 |
| Example 27 | $Li_2Na_{1.7}Ti_{5.5}Cr_{0.1}Nb_{0.4}O_{14}$ | $TiO_2$ | 0 | 0.3 | 0.5 | 0.5 | 0 |
| Example 28 | $Li_2Na_{1.7}Ti_{5.5}Mn_{0.1}Nb_{0.4}O_{14}$ | $TiO_2$ | 0 | 0.3 | 0.5 | 0.5 | 0 |
| Example 29 | $Li_2Na_{1.7}Ti_{5.5}Ni_{0.1}Nb_{0.4}O_{14}$ | $TiO_2$ | 0 | 0.3 | 0.5 | 0.5 | 0 |
| Example 30 | $Li_2Na_{1.7}Ti_{5.5}Al_{0.1}Nb_{0.4}O_{14}$ | $TiO_2$ | 0 | 0.3 | 0.5 | 0.5 | 0 |

TABLE 2-continued

| | Li source/ amount | M1 source/ amount | Ti source/ amount | M2 source/ amount |
|---|---|---|---|---|
| Example 18 | Li$_2$CO$_3$/1.0 | Na$_2$CO$_3$/1.0 | TiO$_2$/0.1 ZrO$_2$/5.9 | — |
| Example 19 | Li$_2$CO$_3$/1.0 | Na$_2$CO$_3$/0.75 | TiO$_2$/5.0 SnO$_2$/0.5 | Nb$_2$O$_5$/0.25 |
| Example 20 | Li$_2$CO$_3$/1.0 | Na$_2$CO$_3$/0.75 | TiO$_2$/5.5 | Nb$_2$O$_5$/0.2 V$_2$O$_5$/0.05 |
| Example 21 | Li$_2$CO$_3$/1.0 | Na$_2$CO$_3$/0.75 | TiO$_2$/5.5 | Nb$_2$O$_5$/0.2 Ta$_2$O$_5$/0.05 |
| Example 22 | Li$_2$CO$_3$/1.0 | Na$_2$CO$_3$/0.7 | TiO$_2$/5.5 | Nb$_2$O$_5$/0.2 MoO$_3$/0.1 |
| Example 23 | Li$_2$CO$_3$/1.0 | Na$_2$CO$_3$/0.7 | TiO$_2$/5.5 | Nb$_2$O$_5$/0.2 WO$_3$/0.1 |
| Example 24 | Li$_2$CO$_3$/1.0 | Na$_2$CO$_3$/0.85 | TiO$_2$/5.5 | Nb$_2$O$_5$/0.2 Y$_2$O$_3$/0.05 |
| Example 25 | Li$_2$CO$_3$/1.0 | Na$_2$CO$_3$/0.85 | TiO$_2$/5.5 | Nb$_2$O$_5$/0.2 Fe$_2$O$_3$/0.05 |
| Example 26 | Li$_2$CO$_3$/1.0 | Na$_2$CO$_3$/0.85 | TiO$_2$/5.5 | Nb$_2$O$_5$/0.2 Co$_2$O$_3$/0.05 |
| Example 27 | Li$_2$CO$_3$/1.0 | Na$_2$CO$_3$/0.85 | TiO$_2$/5.5 | Nb$_2$O$_5$/0.2 Cr$_2$O$_3$/0.05 |
| Example 28 | Li$_2$CO$_3$/1.0 | Na$_2$CO$_3$/0.85 | TiO$_2$/5.5 | Nb$_2$O$_5$/0.2 Mn$_2$O$_3$/0.05 |
| Example 29 | Li$_2$CO$_3$/1.0 | Na$_2$CO$_3$/0.85 | TiO$_2$/5.5 | Nb$_2$O$_5$/0.2 Ni$_2$O$_3$/0.05 |
| Example 30 | Li$_2$CO$_3$/1.0 | Na$_2$CO$_3$/0.85 | TiO$_2$/5.5 | Nb$_2$O$_5$/0.2 Al$_2$O$_3$/0.05 |

<Potential of Hydrogen (pH) of Active Material>

Potential of Hydrogen (pH) of the active materials of Examples 1 and 2 were measured by the previously described method. As a result, pH of the active material of Example 1 was 10.8. Potential of Hydrogen (pH) of the active material of Example 2 was 10.6.

Similarly, the active materials of Examples 3 to 8 were also measured for pH. The active materials of Examples 3 to 8 all had a pH within a range of from 10.8 to 10.9.

<Specific Surface Area>

The active material of Example 1 was measured for specific surface area by the previously described method. As a result, it was confirmed that the active material of Example 1 had a specific surface area of 6.6 m$^2$/g.

<Average Particle Size>

As examined by SEM, the active material of Example 1 was in a single particle form. The active material of Example 1 was measured for average particle size by the previously described procedure. As a result, it was confirmed that the active material of Example 1 had an average primary particle size of 0.65 μm.

<Powder X-Ray Diffraction Method>

For each of Examples 1 to 30 and Comparative Examples 1 to 4, the respectively obtained active material was packed in a standard glass holder with a diameter of 25 mm, and a measurement by powder X-ray diffraction method was performed.

As shown by the result in the following Table 3, it was confirmed from the diffraction patterns that, in the active material of the Example 1, the main phase constituting the titanium-including composite oxide was a mixed phase between a phase of a titanium-including composite oxide represented by the general formula Li$_2$Na$_2$Ti$_6$O$_{14}$ belonging to a space group Fmmm, and a phase of a rutile-type titanium dioxide belonging to a space group P4$_2$/mnm.

It was also confirmed in the XRD chart that, in the active material of Example 1, the intensity ratio $I_{Ti-R}/I_H$ of the main peak $I_{Ti-R}$ of the rutile-type titanium dioxide to the main peak $I_H$ of the titanium-including composite oxide was 0.05.

The active material of the Example 2 was examined in a similar manner, and confirmed that the main phase was a mixed phase between a phase of a titanium-including composite oxide represented by the general formula Li$_2$Na$_2$Ti$_6$O$_{14}$ belonging to a space group Fmmm, and a phase of an anatase-type titanium dioxide belonging to a space group I4$_1$/amd.

Table 3 summarizes the space groups of the main phase (titanium-including composite oxide phase) and the second phase (titanium dioxide phase), the main peaks $I_{Ti}$ of the titanium dioxide and the main peaks $I_H$ of the titanium-including composite oxide, and the peak intensity ratios $I_{Ti}/I_H$ thereof, in the active materials of Examples 1 to 30 and Comparative Examples 1 to 4. In Table 3, the main peak intensities $I_{Ti-R}$ of the rutile-type titanium dioxide and the main peak intensities $I_{Ti-A}$ of the anatase-type titanium dioxide are all put together into the column of "$I_{Ti}$", without distinguishing from each other. However, when a titanium dioxide of the second phase belongs to the space group P4$_2$/mnm, the titanium dioxide can be determined to be of the rutile-type in which case $I_{Ti}$ is $I_{Ti-R}$, while when a titanium dioxide of the second phase belongs to the space group I4$_1$/amd, the titanium dioxide can be determined to be of the anatase-type in which case $I_{Ti}$ is $I_{Ti-A}$.

The devices and conditions used in the measurement are shown below.

SmartLab manufactured by Rigaku, Co., Ltd.
X-ray source: Cu target
Output: 45 kV 200 mA
Soller slit: 5 degrees in both incident light and received light
Step width (2θ): 0.02 deg
Scan speed: 20 deg/min
Semiconductor detector: D/teX Ultra 250
Sample plate holder: Flat glass sample plate holder (0.5 mm in thickness)
Measurement range: 5 degrees≤2θ≤90 degrees The active materials of Examples 1 to 30 and Comparative Examples 1 to 4 were measured by powder X-Ray diffraction to be examined for site occupancy ratio by a Rietveld analysis. The titanium-including complex oxides represented by the general formula Li$_{2+a}$M1$_{2-b}$Ti$_{6-c}$M2$_d$O$_{14+δ}$ were examined for occupancy ratio in M1 sites in each corresponding space group. The fitting parameters S according to the Rietveld analysis were within a range of from 1.3 to 1.8. Table 3 shows results of refining M1 site occupancy ratio by the Rietveld analysis, for each active material.

From powder X-ray diffractions, it was not possible to determine whether a conversion into nanocomposite has occurred, since the peak intensity of the titanium dioxide phase was low. Therefore, each of the active materials was determined as to whether a conversion into nanocomposite has occurred, from a particle observation by a Transmission Electron Microscope which will be described next.

<Transmission Electron Microscope>

To examine the active materials of Examples 1 to 30 and Comparative Example 4 for whether the main phase and the second phase had been converted into a nanocomposite, a particle observation was performed by a Transmission Electron Microscope. As a result, it was confirmed that the active materials of Examples 1 to 30 had a nanocomposite structure where a part of the crystal domain of the titanium-including composite oxide as the main phase had been modified into a titanium dioxide. On the other hand, in the active material of Comparative Example 4, no region where a crystal domain has been modified was observed.

As a specific example, FIG. 6 shows an TEM photograph obtained for the active material of Example 22. As shown in FIG. 6, a modification was observed in a part of a crystal domain of the main phase (the phase of titanium-including composite oxide, Li$_2$Na$_{1.4}$Ti$_{5.5}$Mo$_{0.1}$Nb$_{0.4}$O$_{14}$). Furthermore, an electron diffraction pattern corresponding to the crystal structure of rutile-type titanium dioxide was obtained from an electron diffraction of the modified part 40. In parts other than the modified part 41, an electron diffraction pattern corresponding to the crystal structure of the titanium-including composite oxide of the main phase was obtained. Thus confirmed was a nanocomposite structure which had been formed by a modification of a part of a particle domain into titanium oxide.

The following Table 3 summarizes space groups to which belong the respective crystal structure of the titanium-including composite oxide as the main phase, and the titanium oxide as the second phase; main peak positions (2θ/deg) for the respective phases; intensity ratios of the diffraction peaks; and whether formation of two phase composite had occurred or not in crystal domains, for the active materials of Examples 1 to 30 and Comparative Examples 1 to 4.

From the results shown in Table 3, it is recognized that an amount of formation of composited titanium dioxide varies depending on a composition of the titanium-including composite oxide as the main phase, even if the active material was synthesized under same conditions. It is also recognized from a comparison between Example 4 and Example 6, that a main peak position of rutile-type titanium dioxide has been changed, when a peak intensity ratio of the titanium dioxide is high as in Example 6. It is presumed that this is because a lattice constant of the titanium dioxide is altered due to the formation of a nanocomposite composed of the main phase and the titanium dioxide phase.

<Measurement of Battery Performance>

Li insertion into an active material was conducted on the beaker cells of Examples 1 to 30 and Comparative Example 4, in a manner where the beaker cells were charged for 10 hours under a constant current-constant voltage condition of 0.2 C and 1 V in an environment of 25° C. Then, Li extraction from the active material was conducted on each of the beaker cells, by discharging the cells at 0.2 C constant current, until the cell voltage reached 3 V. At this time, a coulomb amount (an amount of electric current) during initial Li extraction (during initial discharge), namely, an initial discharge capacity, was divided with a coulomb amount (an amount of electric current) during initial Li insertion (during initial charge) to thus obtain a coulomb efficiency, and was defined as an initial charge-and-discharge efficiency (%). Table 4 below shows the initial discharge capacity and the initial charge-and-discharge efficiency obtained for each of the beaker cells.

Next, a second charge-and-discharge was performed under the same condition. A discharge capacity during Li extraction performed in the second charge-and-discharge cycle at 0.2 C constant current, until the cell voltage reached 3 V was defined as a 0.2 C-discharge capacity. Next, after performing Li insertion under a constant current-constant voltage condition of 0.2 C and 1 V for 10 hours, Li extraction was conducted at 10 C constant current until the cell voltage reached 3 V. The discharge capacity during which was defined as 10 C-discharge capacity. Table 4 shows the obtained ratio of the 10 C-discharge capacity to the 0.2 C-discharge capacity, namely, a 10 C/0.2 C discharge capacity ratio.

TABLE 3

| | Space group of main phase | Space group of second phase | $I_{Ti}$ 2θ/deg | $I_H$ 2θ/deg | Diffraction peak intensity $I_{Ti}/I_H$ | M1 site occupancy (%) | Whether formation of composite within crystal domain had occurred |
|---|---|---|---|---|---|---|---|
| Comparative Example 1 | Fmmm | — | — | 18.14 | — | 100 | — |
| Comparative Example 2 | Cmca | — | — | 19.25 | — | 100 | — |
| Comparative Example 3 | Fmmm | — | — | 18.14 | — | 75.1 | — |
| Comparative Example 4 | Fmmm | $I4_1/amd$ | 25.29 | 18.14 | 0.5 | 100 | Not occurred |
| Example 1 | Fmmm | $P4_2/mnm$ | 27.44 | 18.14 | 0.05 | 100 | Occurred |
| Example 2 | Fmmm | $I4_1/amd$ | 25.28 | 18.14 | 0.05 | 100 | Occurred |
| Example 3 | Fmmm | $P4_2/mnm$ | 27.44 | 18.16 | 0.05 | 99.2 | Occurred |
| Example 4 | Fmmm | $P4_2/mnm$ | 27.44 | 18.14 | 0.05 | 74.8 | Occurred |
| Example 5 | Fmmm | $P4_2/mnm$ | 27.43 | 18.15 | 0.1 | 74.9 | Occurred |
| Example 6 | Fmmm | $P4_2/mnm$ | 27.41 | 18.17 | 1.0 | 75.1 | Occurred |
| Example 7 | Fmmm | $P4_2/mnm$ | 27.41 | 18.17 | 1.0 | 74.8 | Occurred |
| Example 8 | Fmmm | $P4_2/mnm$ | 27.44 | 18.15 | 0.01 | 75.1 | Occurred |
| Example 9 | Cmca | $P4_2/mnm$ | 27.43 | 18.14 | 0.5 | 100 | Occurred |
| Example 10 | Cmca | $P4_2/mnm$ | 27.44 | 19.18 | 0.22 | 100 | Occurred |
| Example 11 | Cmca | $P4_2/mnm$ | 27.43 | 19.16 | 0.58 | 11.3 | Occurred |
| Example 12 | Cmca | $P4_2/mnm$ | 27.44 | 19.25 | 0.23 | 100 | Occurred |
| Example 13 | Cmca | $P4_2/mnm$ | 27.44 | 19.21 | 0.25 | 100 | Occurred |
| Example 14 | Cmca | $P4_2/mnm$ | 27.44 | 19.14 | 0.23 | 100 | Occurred |
| Example 15 | Fmmm | $P4_2/mnm$ | 27.44 | 18.13 | 0.05 | 74.8 | Occurred |
| Example 16 | Fmmm | $P4_2/mnm$ | 27.44 | 18.14 | 0.06 | 74.9 | Occurred |
| Example 17 | Fmmm | $P4_2/mnm$ | 27.44 | 18.13 | 0.06 | 74.8 | Occurred |
| Example 18 | Fmmm | $P4_2/mnm$ | 27.44 | 18.15 | 0.12 | 100 | Occurred |
| Example 19 | Fmmm | $P4_2/mnm$ | 27.44 | 18.14 | 0.31 | 74.9 | Occurred |
| Example 20 | Fmmm | $P4_2/mnm$ | 27.43 | 18.15 | 0.52 | 75.0 | Occurred |
| Example 21 | Fmmm | $P4_2/mnm$ | 27.44 | 18.15 | 0.23 | 74.9 | Occurred |
| Example 22 | Fmmm | $P4_2/mnm$ | 27.43 | 18.16 | 0.45 | 70.3 | Occurred |
| Example 23 | Fmmm | $P4_2/mnm$ | 27.44 | 18.15 | 0.15 | 70.1 | Occurred |
| Example 24 | Fmmm | $P4_2/mnm$ | 27.44 | 18.16 | 0.05 | 85.1 | Occurred |
| Example 25 | Fmmm | $P4_2/mnm$ | 27.44 | 18.16 | 0.06 | 85.0 | Occurred |
| Example 26 | Fmmm | $P4_2/mnm$ | 27.44 | 18.15 | 0.05 | 85.1 | Occurred |
| Example 27 | Fmmm | $P4_2/mnm$ | 27.44 | 18.16 | 0.06 | 84.9 | Occurred |
| Example 28 | Fmmm | $P4_2/mnm$ | 27.44 | 18.15 | 0.05 | 85.1 | Occurred |
| Example 29 | Fmmm | $P4_2/mnm$ | 27.44 | 18.15 | 0.04 | 85.2 | Occurred |
| Example 30 | Fmmm | $P4_2/mnm$ | 27.44 | 18.17 | 0.08 | 85.1 | Occurred |

Then, the charge-and-discharge cycle was repeated 100 times on each beaker cell of Examples 1 to 30 and Comparative Examples 1 to 4. Here, 1 cycle of charge-and-discharge cycle was set as: a charge under the constant current-constant voltage condition of 0.2 C and 1 V for 10 hours and a discharge at 0.2 C constant current until a cell voltage reached 3 V. Table 4 below shows the capacity retention ratio (=capacity at the 100th time/initial capacity× 100 [%]), which serves as an index of life performance of the active material.

TABLE 4

| | Initial discharge capacity (mAh/g) | Initial charge-and-discharge efficiency (%) | 10 C/ 0.2 C discharge capacity ratio | Capacity retention ratio after 100 cycles (%) | Potential at SOC 50% (V vs. $Li^+/Li$) |
|---|---|---|---|---|---|
| Comparative Example 1 | 91.0 | 92.1 | 89.9 | 90.5 | 1.28 |
| Comparative Example 2 | 107.1 | 92.2 | 89.4 | 89.6 | 1.43 |
| Comparative Example 3 | 131.2 | 93.4 | 92.6 | 93.1 | 1.34 |
| Comparative Example 4 | 93.0 | 90.3 | 90.3 | 95.2 | 1.28 |
| Example 1 | 93.8 | 92.2 | 91.7 | 95.6 | 1.28 |
| Example 2 | 93.2 | 91.6 | 90.8 | 95.5 | 1.28 |
| Example 3 | 94.1 | 92.3 | 91.1 | 95.4 | 1.28 |
| Example 4 | 132.5 | 93.8 | 93.2 | 96.0 | 1.34 |
| Example 5 | 133.4 | 92.4 | 93.5 | 95.8 | 1.34 |
| Example 6 | 131.9 | 91.7 | 92.5 | 95.3 | 1.34 |
| Example 7 | 133.2 | 90.5 | 93.6 | 98.2 | 1.34 |
| Example 8 | 132.8 | 94.0 | 93.6 | 96.5 | 1.34 |
| Example 9 | 123.9 | 92.8 | 92.6 | 95.9 | 1.43 |
| Example 10 | 129.3 | 92.3 | 93.5 | 95.2 | 1.42 |
| Example 11 | 115.2 | 92.1 | 93.9 | 95.3 | 1.46 |
| Example 12 | 122.5 | 92.2 | 92.2 | 95.9 | 1.42 |
| Example 13 | 123.7 | 92.1 | 91.8 | 96.1 | 1.42 |
| Example 14 | 127.1 | 92.4 | 92.6 | 96.2 | 1.42 |
| Example 15 | 130.8 | 93.8 | 93.9 | 96.0 | 1.34 |
| Example 16 | 129.9 | 93.5 | 93.8 | 95.8 | 1.34 |
| Example 17 | 129.3 | 93.8 | 93.7 | 95.7 | 1.34 |
| Example 18 | 92.2 | 91.8 | 91.1 | 95.4 | 1.34 |
| Example 19 | 118.3 | 91.5 | 93.8 | 95.7 | 1.34 |
| Example 20 | 125.5 | 92.7 | 94.0 | 95.5 | 1.34 |
| Example 21 | 128.9 | 93.3 | 93.9 | 96.0 | 1.34 |
| Example 22 | 125.3 | 92.8 | 94.1 | 96.2 | 1.34 |
| Example 23 | 122.2 | 92.9 | 93.8 | 95.4 | 1.34 |
| Example 24 | 131.0 | 93.9 | 93.5 | 96.2 | 1.29 |
| Example 25 | 128.8 | 92.5 | 93.6 | 95.9 | 1.32 |
| Example 26 | 127.3 | 93.0 | 93.6 | 96.0 | 1.32 |
| Example 27 | 127.5 | 92.9 | 93.5 | 96.1 | 1.32 |
| Example 28 | 125.3 | 93.2 | 93.7 | 96.0 | 1.32 |
| Example 29 | 126.6 | 93.0 | 93.8 | 96.0 | 1.32 |
| Example 30 | 125.0 | 93.1 | 93.3 | 96.0 | 1.32 |

It is recognized from the results shown in Table 4 that an active material including a region where a nanocomposite composed of the titanium-including composite oxide and the titanium dioxide have been formed is excellent in rate performance and in repeated-charge-and-discharge performance. In particular, it is recognized that a charge-and-discharge capacity is increased when an active material includes the titanium-including composite oxide into which vacancies are introduced, as well as a region where a the titanium-including composite oxide and the titanium dioxide form a nanocomposite.

It is also recognized from the result of comparison of Examples 1 and 2, that a performance preferred as an active material for batteries are even more excellent, when the titanium dioxide as the second phase forming a composite with the main phase is rutile-type. It is considered that this is because, as described above, rutile-type has a higher affinity of lattice in the region converted into a nanocomposite, and thus facilitate movement of Li ions.

Example 31

In Example 31, a nonaqueous electrolyte battery was produced in the following manner.

(Production of Negative Electrode)

First, particles of the active material of Example 5 were ground to obtain a ground product having an average particle size of 5 μm or less. Next, acetylene black as a conductive agent was added in a proportion of 6 parts by mass with reference to 100 parts by mass of the active material, thereby obtaining a mixture. Subsequently, the mixture was dispersed in NMP to obtain a dispersion. The dispersion was mixed with polyvinylidene fluoride (PVdF) as a binder in a proportion of 10 parts by mass with reference to the active material of Example 5, thereby preparing a negative electrode slurry. The slurry was applied using a blade onto a current collector made of an aluminum foil. The slurry was dried at 130° C. for 12 hours under vacuum to form an electrode layer on the current collector. The current collector and electrode layer were rolled such that the electrode layer would have a density of 2.2 g/cm² (excluding the current collector), thereby obtaining a negative electrode.

(Production of Positive Electrode)

100 parts by mass of a commercially available spinel lithium manganese oxide ($LiMn_2O_4$) were mixed with 5 parts by mass of acetylene black as a conductive agent, thereby obtaining a mixture. Subsequently, the mixture was dispersed in NMP to obtain a dispersion. The dispersion was mixed with PVdF as a binder in a proportion of 5 parts by weight with reference to lithium manganese oxide, thereby obtaining a positive electrode slurry. The slurry was applied using a blade onto a current collector made of an aluminum foil. The slurry was dried at 130° C. for 12 hours under vacuum to form an electrode layer on the current collector. The current collector and electrode layer were rolled such that the electrode layer would have a density of 2.1 g/cm³ (excluding the current collector), thereby obtaining a positive electrode.

(Production of Electrode Group)

The positive electrode and negative electrode produced as described above were stacked with a polyethylene separator sandwiched therebetween, thereby obtaining a layered stack. Subsequently, the stack was wound, and further pressed to obtain a flat-shaped wound electrode group. A positive electrode terminal and a negative electrode terminal were connected to the electrode group.

(Preparation of Nonaqueous Electrolyte)

As a mixed solvent, a mixed solvent of ethylene carbonate and diethyl carbonate (volume ratio 1:1) was provided. Lithium hexafluorophosphate ($LiPF_6$) was dissolved in the solvent at a concentration of 1 M. In this manner, a nonaqueous electrolyte was prepared.

(Assembly of Nonaqueous Electrolyte)

The nonaqueous electrolyte battery of Example 31 was produced using the electrode group and nonaqueous electrolyte produced as described above.

(Charge-and-Discharge Test)

This nonaqueous electrolyte battery of Example 31 was subjected to a charge-and-discharge test at room temperature. The charge-and-discharge test was performed in a voltage range of from 1.8 V to 3.1 V in terms of cell voltage, with a charge-and-discharge electric current value set to 0.2 C (hourly discharge rate).

FIG. 7 shows charge-and-discharge curves (a charge curve 50 and a discharge curve 51) of the nonaqueous electrolyte battery of Example 31. It was recognized that the nonaqueous electrolyte battery of Example 31 operates in a voltage range of from 2.3 V to 3.0 V, as is also apparent from FIG. 7.

Example 32

Figure 8:
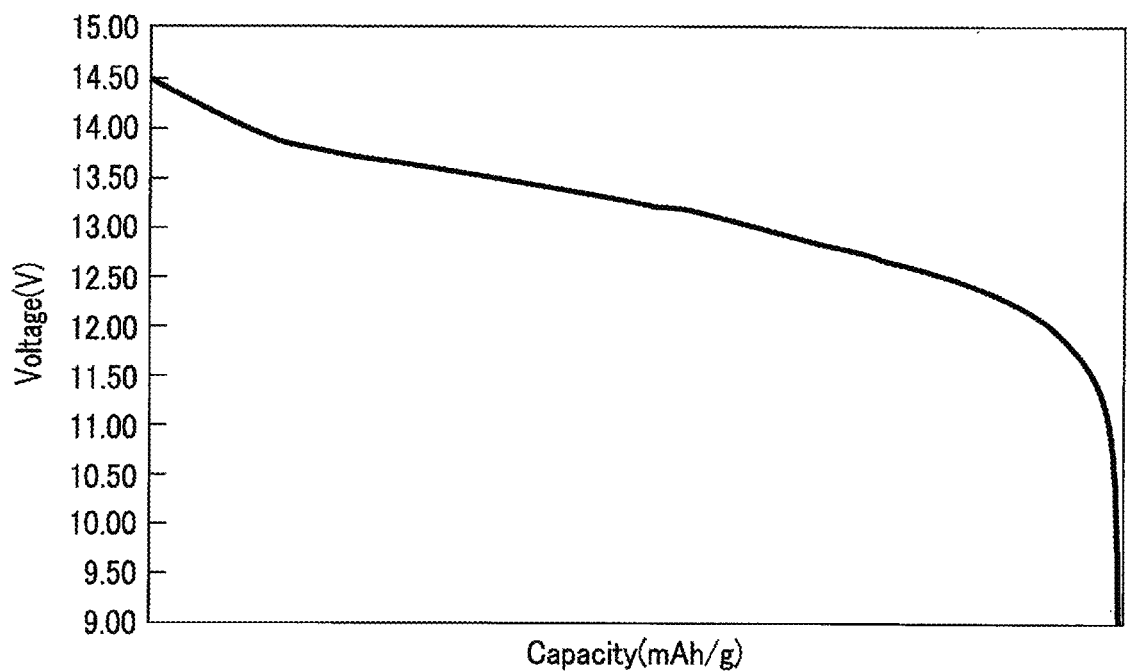
FIG. 8 is a graph showing a discharge line of the battery pack of the Example 32.

In Example 32, a battery pack including five nonaqueous electrolyte batteries of Example 31, in which these nonaqueous electrolyte batteries were electrically connected in series was produced. The battery pack was subjected to a charge-and-discharge test in a voltage range of from 9.0 V to 15.5 V in terms of pack voltage of five-cell-in-series-connection, with a charge-and-discharge current value set to 0.2 C (hourly discharge rate). FIG. 8 shows the obtained discharge curve of the battery pack.

From the result, it is recognized that a battery pack of 5 cells connected in series having an average operation voltage of about 13.5 V can be obtained by use of the active material of Example 5 as a negative electrode active material. It is also recognized, as shown in FIG. 8, that a shape of a voltage plateau is moderately and smoothly sloped in the discharge curve of the battery pack. This namely shows that, by use of the active material of the Example 5 as a negative electrode, and thus making the average operation voltage high as described above, it was possible to obtain a battery pack having a potential of high affinity with a 12 V lead storage battery for automobiles, and a high energy density with a low electric resistance, in a compact size, at a low cost, even with the number of cells connected in series configured to be five in series as described above.

An active material according to at least one of the embodiments and Examples described above includes a phase of a titanium-including composite oxide and a phase of titanium dioxide, where the titanium-including composite oxide has a crystal structure belonging to a space group Cmca, a space group Fmmm, or both the space group Cmca and the space group Fmmm, and the active material includes a region where the titanium-including composite oxide and the titanium dioxide compose a composite. As a result, the active material can realize a nonaqueous electrolyte battery capable of exhibiting an excellent input-and-output performance and an excellent life performance.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An active material comprising particles comprising a nanocomposite region where a main phase of a titanium-comprising composite oxide and a second phase of titanium dioxide co-exist within a crystal domain of the titanium-comprising composite oxide, the titanium-comprising composite oxide having a crystal structure belonging to a space group Cmca, a space group Fmmm, or both the space group Cmca and the space group Fmmm.

2. The active material according to claim 1, wherein the titanium-comprising composite oxide comprises a vacancy site within the crystal structure.

3. The active material according to claim 1, wherein the titanium-comprising composite oxide comprises a composite oxide represented by a general formula $Li_{2+a}M1_{2-b}Ti_{6-c}M2_dO_{14+\delta}$, wherein M1 is at least one selected from the group consisting of Sr, Ba, Ca, Mg, Na, Cs, Rb, and K, M2 is at least one selected from the group consisting of Zr, Sn, V, Nb, Ta, Mo, W, Y, Fe, Co, Cr, Mn, Ni, and Al, a is within a range of $0 \leq a \leq 6$, b is within a range of $0 \leq b < 2$, c is within a range of $0 \leq c < 6$, d is within a range of $0 \leq d < 6$, and $\delta$ is within a range of $-0.5 \leq \delta \leq 0.5$.

4. The active material according to claim 1, wherein an intensity ratio $I_{Ti-R}/I_H$ in an X-ray diffraction diagram of the active material, obtained by an powder X-ray diffraction method using a Cu-Kα ray, is within a range of $0.01 \leq I_{Ti-R}/I_H \leq 1$, where $I_{Ti-R}$ is an intensity of a diffraction peak assigned to a main peak of a rutile-type titanium dioxide among diffraction peaks appearing within a range of $26° \leq 2\theta \leq 28°$, and $I_H$ is an intensity of a diffraction peak of strongest intensity among diffraction peaks appearing within a range of $18.5° < 2\theta \leq 19.5°$.

5. The active material according to claim 1, wherein an intensity ratio $I_{Ti-A}/I_H$ in an X-ray diffraction pattern of the active material, obtained by an powder X-ray diffraction method using a Cu-Kα ray, is within a range of $0.01 \leq I_{Ti-A}/IH \leq 1$, where $I_{Ti-A}$ is an intensity of a diffraction peak assigned to a main peak of an anatase-type titanium dioxide among diffraction peaks appearing within a range of $24° \leq 2\theta \leq 26°$, and $I_H$ is an intensity of a diffraction peak of strongest intensity among diffraction peaks appearing within a range of $18.5° < 2\theta \leq 19.5°$.

6. The active material according to claim 1, which has a particulate form and further comprises a layer comprising carbon on at least a part of a surface of the active material.

7. A nonaqueous electrolyte battery comprising:
a positive electrode;
a negative electrode comprising the active material according to claim 1; and
a nonaqueous electrolyte.

8. The nonaqueous electrolyte battery according to claim 7, wherein the positive electrode comprises a positive electrode active material, and the positive electrode active material comprises an iron-comprising phosphorus oxide having an olivine structure.

9. The nonaqueous electrolyte battery according to claim 7, wherein the positive electrode comprises a positive electrode active material, and the positive electrode active material comprises at least one compound selected from the group consisting of a lithium manganese composite oxide having a spinel structure and a lithium nickel manganese cobalt composite oxide having a layered structure.

10. A battery pack comprising the nonaqueous electrolyte battery according to claim 7.

11. The battery pack according to claim 10, further comprising:
an external power distribution terminal; and
a protective circuit.

12. The battery pack according to claim 10, comprising a plurality of the nonaqueous electrolyte batteries, the nonaqueous electrolyte batteries being electrically connected in series, in parallel, or in a combination of in series and in parallel.

13. A vehicle comprising the battery pack according to claim 10.

14. The vehicle according to claim 13, wherein the battery pack is configured to recover a regenerative energy of a power of the vehicle.

15. An electrode comprising the active material according to claim 1.

* * * * *